(12) United States Patent
Kaasila

(10) Patent No.: US 6,437,793 B1
(45) Date of Patent: Aug. 20, 2002

(54) SYSTEM FOR RAPIDLY PERFORMING SCAN CONVERSION WITH ANTI-ALIASING UPON OUTLINE FONTS AND OTHER GRAPHIC ELEMENTS

(75) Inventor: Sampo J. Kaasila, Plaistow, NH (US)

(73) Assignee: Bitstream Inc., Cambridge, MA (US)

( * ) Notice: Subject to any disclaimer, the term of this patent is extended or adjusted under 35 U.S.C. 154(b) by 0 days.

(21) Appl. No.: 09/363,513

(22) Filed: Jul. 29, 1999

(51) Int. Cl.$^7$ ............................................. G06T 11/20
(52) U.S. Cl. ........................................ 345/611; 345/441
(58) Field of Search ................................. 345/433, 443, 345/136, 619, 611, 421, 606, 441, 442, 613, 614; 382/269

(56) References Cited

U.S. PATENT DOCUMENTS

| | | | | |
|---|---|---|---|---|
| 5,404,431 A | * | 4/1995 | Kumazaki et al. | 345/443 |
| 5,438,656 A | | 8/1995 | Valdes et al. | 395/143 |
| 5,579,030 A | | 11/1996 | Karow | 345/143 |
| 5,589,851 A | | 12/1996 | Valdes et al. | 345/136 |
| 5,719,595 A | | 2/1998 | Hoddie et al. | 345/136 |
| 6,091,425 A | * | 7/2000 | Law | 345/433 |

FOREIGN PATENT DOCUMENTS

| | | | |
|---|---|---|---|
| EP | 0786757 A1 | 7/1997 | G09G/5/28 |
| EP | 0910047 | 4/1999 | G06T/15/10 |
| WO | PCT/US/00/21559 | 11/2000 | |
| WO | PCT/US00/21559 | 7/2001 | |

OTHER PUBLICATIONS

"Computer Graphics: Principles and Practices" Second Edition, 1990, by Foley, van Dam, Feiner, and Hughes, Addison–Wesley Publishing Company, p976–979.

"Composing 3D Images with Antialiasing and Various Shading Effects" by Nakamae et al., IEEE Computer Graphics and Applications, US, IEEE Inc, New York, vol. 9, No. 2, Mar. 1, 1989, pp. 21–29.

"Cross scanline algorithm for anti–aliasing", by Tanaka et al., Transactions of the Infromation Processing Society of Japan, 1991, as discribed by on sheet printout from INSPEC Online.

* cited by examiner

*Primary Examiner*—Jeffery Brier
(74) *Attorney, Agent, or Firm*—Edward W. Porter

(57) ABSTRACT

A system rapidly rasterizes high resolution shapes, such as outline fonts, for use in a lower resolution pixel image. For individual pixels a line coverage value is determined for each of at least two sampling lines running in different directions, such as at right angles, within the pixel. The pixel's line coverage value for each line is a function of the degree to which the line is covered by any shapes within the pixel. Then a coverage value is determined for the pixel, itself, as a non-linear function of it's one or more line coverage values running in each of the different directions. Commonly the non-linear function causes the pixel's coverage value to vary more rapidly with variations in the line coverage value of that one of its sampling line which is closest to being half covered within the pixel. Such rasterization can be performed even more rapidly by using two passes, a first which calculates a pixel coverage value for all pixels as a function of the coverage within each pixel of one or more lines of the first set of parallel lines which run in a first direction, and a second pass which varies the pixel coverage value set in the first pass only if there is an intersection between the outline of a shape being rendered and a one or more lines of the second set of parallel lines which run in a second direction.

21 Claims, 16 Drawing Sheets

FIG. 1 -- PRIOR ART
FIG. 2 -- PRIOR ART
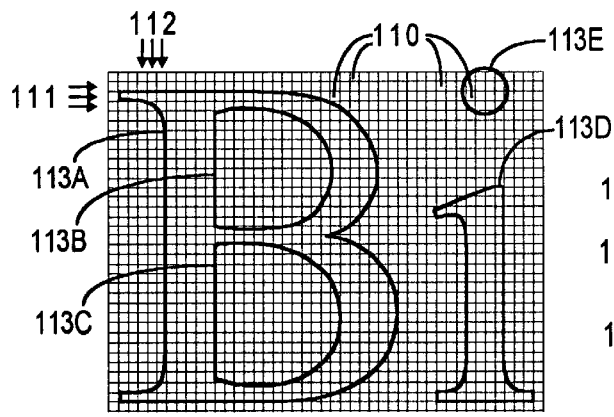
FIG. 3 -- PRIOR ART
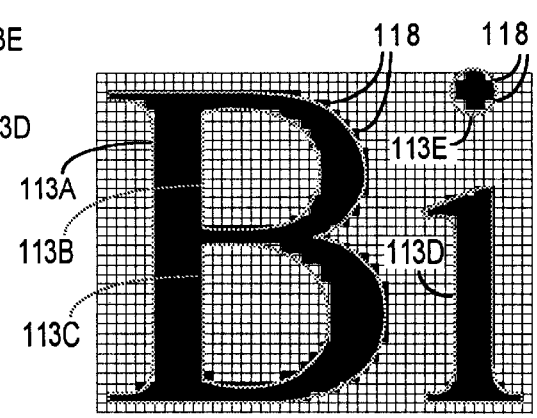
FIG. 4 -- PRIOR ART
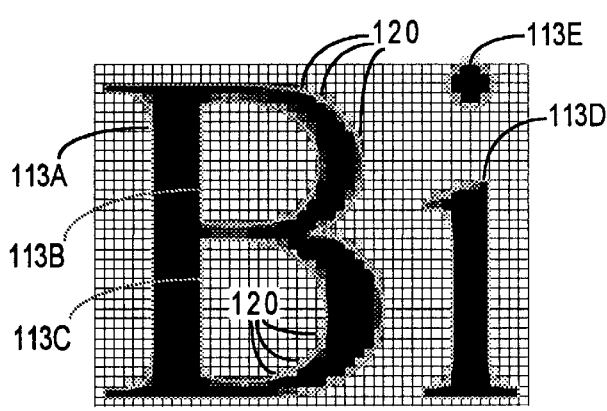
FIG. 5 -- PRIOR ART
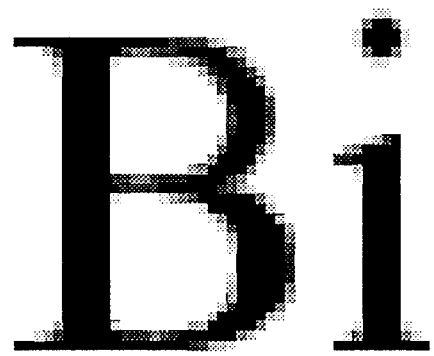
FIG. 6 -- PRIOR ART -pixel coverage value calculation method~188
    -for each boundary pixel~190
        -calculate degree of coverage of pixel's one or more lines in first direction~192
        -calculate degree of coverage of pixel's one or more lines in second direction~194
        -calculate pixel's greyscale as a non-linear function of degree of coverage of the lines, in which the effect the coverage value of a given line has on the calculated grayscale varies as a function of the coverage value~196

FIG. 12

-drawText~200
    -for each char in bitmap to be drawn~202
        -call CharSetUp~204
        -for each XLine in character~206
            -point fillStart to first intersection on XLine's linked list~208
            -point fillEnd to second intersection on XLine's linked list~210
            -call XLinePass~212
        -for each Yline in character~214
            -point fillStart to first intersection on YLine's linked list~216
            -point fillEnd to second intersection on YLine's linked list~218
            -call YLinePass~220
        -add char's bitmap value to corresponding screen position, and/or save it in bitmap cache~222

FIG. 33

-charSetUp~224
    -for each of char's outlines~226
        -until have completed outline~230
            -advance around outline until reach next intersection with a medial line~232
            -decide which X or Y line the intersection is in~234
            -place representation of the intersection in the proper position in that line's linked list~236
    -form a grayscale bitmap large enough to hold char's X and Y lines~246
    -zero bitmap~248

FIG. 34

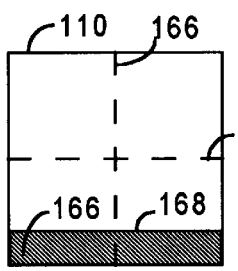 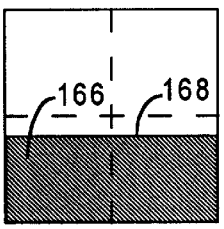 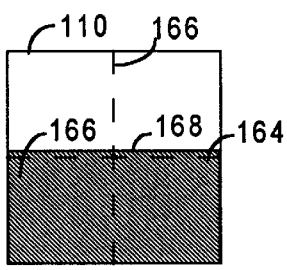 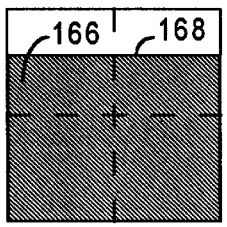
FIG. 13  FIG. 14  FIG. 15  FIG. 16
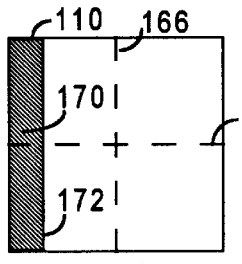 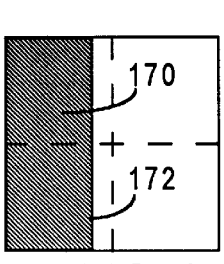 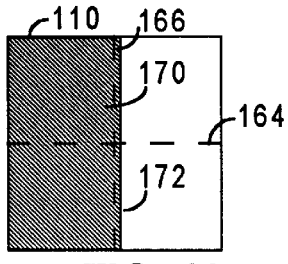 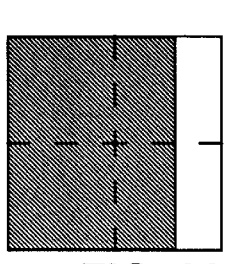
FIG. 17  FIG. 18  FIG. 19  FIG. 20
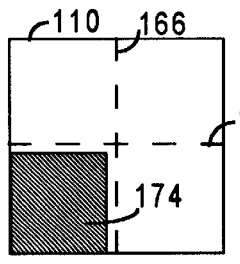 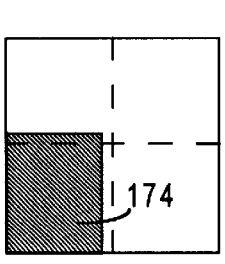 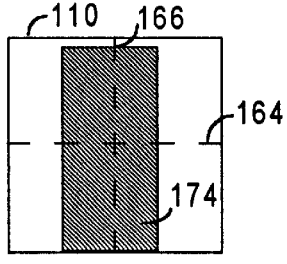 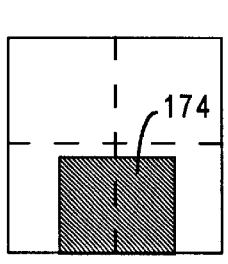
FIG. 21  FIG. 22  FIG. 23  FIG. 24
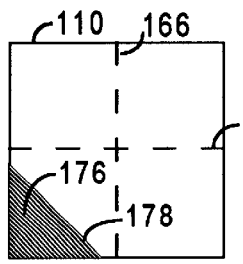 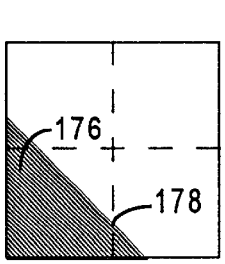 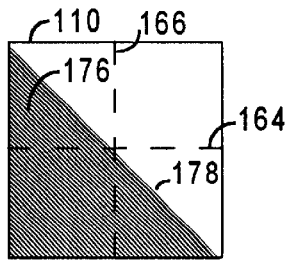 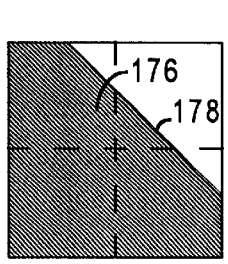
FIG. 25  FIG. 26  FIG. 27  FIG. 28
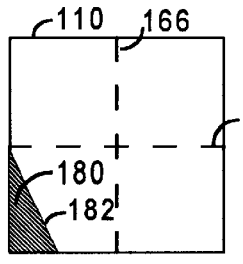 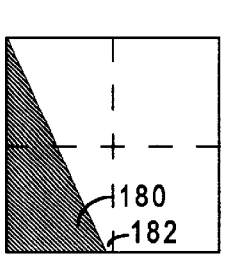 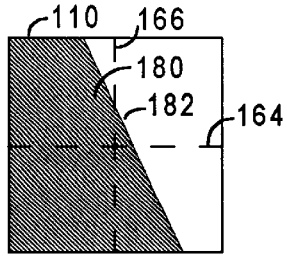 
FIG. 29  FIG. 30  FIG. 31  FIG. 32

-XLinePass~254
    -zero winding count~256
    -XLine loop~258
        -set currentPixel# to the number of the pixel in which fillStart's position is located~260
        -add edgeValues of fillStart and fillEnd to windingCount~262
        -while windingCount is not 0~264
            -set fillEnd to next intersection in linked list~266
            -add new fillEnd's edgeValue to windingCount~268
       -if fillEnd's positions is in the currentPixel#~270
            -add distance between the positions of fillEnd and fillStart to the currentPixel#'s bitmap element~272
       -else ~274
            -add to the currentPixel#'s bitmap element the distance between fillStart's position and the right edge of the currentPixel# 's pixel~276
            -increment currentPixel# ~278
            -if fillEnd's position has a pixel number greater than the currentPixel#~280
                -if address of currentPixel#'s element in the bitmap is odd~282
                    set currentPixel#'s bitmap element to 126~284
                    -increment currentPixel# by one~286
                -while currentPixel# is less than fillEnd's pixel number~288
                    -use 2 byte word write to write two successive values of 126 to bitmap, starting with currentPixel#'s bitmap element~290
                    -increment currentPixel# by 2~292
            -set fillEnd's pixel's bitmap element to distance between left edge of fillEnd's pixel and fillEnd's position~294
       -if there is an intersection in the XLine's linked list after fillEnd~296
            -point fillStart to that next intersection~298
            -point fillEnd to the following intersection in the linked list~300
    -else~302
        -break from XLine loop~304

FIG. 35

-YLinePass~306
    -zero winding count~308
    -zero CY~309
    -set pendingPixel# to a NULL value~310
    -YlineLoop~312
        -add edgeValues of fillStartIntersection and fillEndIntersection to windingCount~314
        -while windingCount is not 0~316
            -point fillEndIntersection to next intersection in linked list~318
            -add fillEndIntersection's edgeValue to windingCount~320
        -if pendingPixel# is non-NULL and fillStartIntersection's position does not have the pendingPixel#~322
            -set CX = prior grayscale of pendingPixel#'s bitmap element~324
            -calculate grayscale as function of CY and CX~326
            -write calculated grayscale to pendingPixel#'s bitmap element~328
            -set CY to 0~330
        -if the positions of fillStartIntersection and fillEndIntersection are in same pixel~332
            -CY = CY + distance between the position's of fillStartIntersection and fillEndIntersection~334
            -set pendingPixel# to fillEndIntersection's pixel number~336
        -else~338
            -CY = CY + distance between fillStartIntersection's position and the end of fillStartIntersection's pixel~340
            -set pendingPixel# equal to fillStartIntersection's pixel number~342
            -set CX = prior grayscale of pendingPixel#'s bitmap element~344
            -calculate grayscale as function of CY and CX~346
            -write calculated grayscale to pendingPixel#'s bitmap element~348
            -CY = distance between start of fillEndIntersection's pixel and fillEndIntersection's position~350
            -set pendingPixel# to fillEndIntersection's pixel number~352
        -if there is an intersection in the YLine's linked list after fillEndIntersection~354
            -point fillStartIntersection to that next intersection~356
            -point fillEndIntersection to the following intersection in the linked list~358
        -else~360
            -break from YLine loop~362
    -if pendingPixel# is not NULL~364
        -set CX = prior grayscale of pendingPixel#'s bitmap element~366
        -calculate grayscale as function of CY and CX~368
        -write calculated grayscale to pendingPixel#'s bitmap element~370

FIG. 36

$- ((((3970-(63-CX)^\wedge 2)^*CX) + ((3970-(63-CY)^\wedge 2)^*CY)) / ((3970-(63-CX)^\wedge 2) + (3970-(63-CY)^\wedge 2))$

FIG. 37

$-((64-ABS(63-CX))^*CX + (64-ABS(63-CY))^*CY) / (64-ABS(63-CX) + 64-ABS(63-CY))$

FIG. 38

```
-binaryPixelCoverageValueAlgorithm
    -if( CX=CY) then
        -CX
    -else if( ABS(63-CX) > ABS(63-CY) then
        -CY
    -else CX
```

FIG. 39

```
-LookUpPixelCoverageAlgorithm~650
-form current look-up address from current pixel's values of CX and CY~652
-obtain current pixel's coverage value from the look-up table's entry at current look-up
    address~654
```

FIG. 40

|    | Y0 | Y1  | Y2  | Y3  | Y4  | Y5  | Y6  | Y7 |
|----|----|-----|-----|-----|-----|-----|-----|----|
| X0 | 0  | 0   | 0   | 0   | 0   | 0   | 0   | 0  |
| X1 | 0  | 70  | 92  | 0   | 0   | 96  | 62  | 0  |
| X2 | 0  | 70  | 92  | 0   | 0   | 32  | 120 | 0  |
| X3 | 0  | 70  | 92  | 0   | 0   | 66  | 92  | 0  |
| X4 | 0  | 70  | 126 | 126 | 126 | 126 | 24  | 0  |
| X5 | 0  | 70  | 92  | 0   | 0   | 36  | 126 | 32 |
| X6 | 0  | 70  | 92  | 0   | 0   | 0   | 126 | 58 |
| X7 | 0  | 74  | 92  | 0   | 0   | 48  | 126 | 20 |
| X8 | 96 | 126 | 126 | 126 | 126 | 42  | 0   | 0  |
FIG. 44
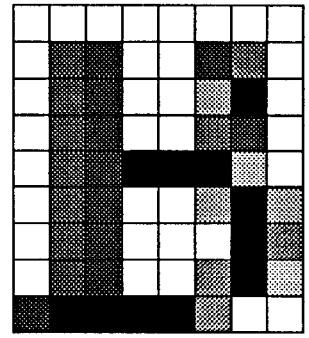
FIG. 45
|    | Y0 | Y1 | Y2 | Y3 | Y4 | Y5  | Y6  | Y7 |
|----|----|----|----|----|----|-----|-----|----|
| X0 | 26 | 52 | 52 | 52 | 46 | 26  |     |    |
| X1 |    |    |    | 4  | 20 | 102 | 64  |    |
| X2 |    |    |    |    |    |     |     |    |
| X3 |    |    |    |    |    | 64  | 102 |    |
| X4 |    |    |    | 54 | 70 |     | 46  |    |
| X5 |    |    |    |    |    | 28  |     |    |
| X6 |    |    |    |    |    |     |     |    |
| X7 |    |    |    |    |    |     | 46  |    |
| X8 | 38 | 76 | 76 | 48 | 58 | 58  | 12  |    |
FIG. 46
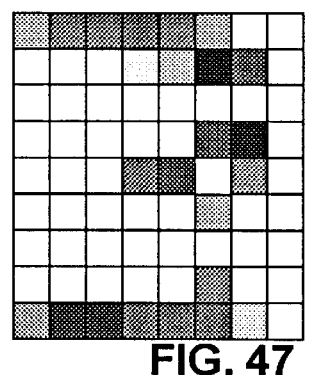
FIG. 47
|    | Y0 | Y1 | Y2 | Y3 | Y4 | Y5 | Y6 | Y7 |
|----|----|----|----|----|----|----|----|----|
| X0 | 26 | 52 | 52 | 52 | 46 | 26 |    |    |
| X1 |    |    |    | 4  | 20 |    | 64 |    |
| X2 |    |    |    |    |    |    |    |    |
| X3 |    |    |    |    |    | 64 |    |    |
| X4 |    |    |    | 54 | 70 |    | 46 |    |
| X5 |    |    |    |    |    |    |    |    |
| X6 |    |    |    |    |    |    |    |    |
| X7 |    |    |    |    |    |    |    |    |
| X8 | 38 | 76 | 76 | 48 | 58 | 58 | 12 |    |
FIG. 48
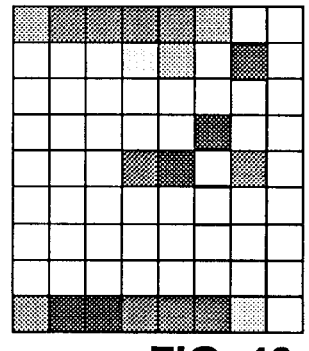
FIG. 49
|    | Y0 | Y1  | Y2  | Y3 | Y4 | Y5  | Y6  | Y7 |
|----|----|-----|-----|----|----|-----|-----|----|
| X0 | 26 | 52  | 52  | 52 | 46 | 26  | 0   | 0  |
| X1 | 0  | 70  | 92  | 4  | 20 | 96  | 64  | 0  |
| X2 | 0  | 70  | 92  | 0  | 0  | 32  | 120 | 0  |
| X3 | 0  | 70  | 92  | 0  | 0  | 64  | 92  | 0  |
| X4 | 0  | 70  | 126 | 54 | 70 | 126 | 46  | 0  |
| X5 | 0  | 70  | 92  | 0  | 0  | 36  | 126 | 32 |
| X6 | 0  | 70  | 92  | 0  | 0  | 0   | 126 | 58 |
| X7 | 0  | 74  | 92  | 0  | 0  | 48  | 126 | 20 |
| X8 | 38 | 76  | 76  | 48 | 58 | 58  | 12  | 0  |
FIG. 50
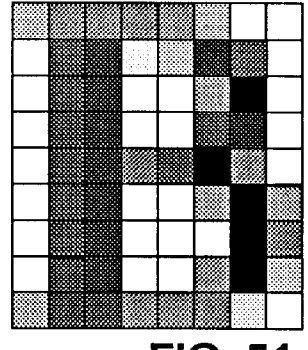
FIG. 51

FIG. 52

AREA OF PIXEL = =IF( CX=CY, CX, IF( ABS(63-CX)>ABS(63-CY), CY, CX) )

AREA ("A") VALUES

500

| | 0 | 10 | 19 | 28 | 37 | 46 | 55 | 63 | 73 | 82 | 91 | 100 | 109 | 118 | 126 | X |
|---|---|---|---|---|---|---|---|---|---|---|---|---|---|---|---|---|
| 0 | 0 | | | | | | | | | | | | | | 126 | |
| 10 | | 10 | 19 | 28 | 37 | 46 | 55 | 63 | 73 | 82 | 91 | 100 | 109 | 118 | 126 | |
| 19 | | 10 | 19 | 28 | 37 | 46 | 55 | 63 | 73 | 82 | 91 | 100 | 109 | 118 | | |
| 28 | | 19 | 19 | 28 | 37 | 46 | 55 | 63 | 73 | 82 | 91 | 100 | 109 | | | |
| 37 | | 28 | 28 | 28 | 37 | 46 | 55 | 63 | 73 | 82 | 91 | 100 | 28 | 28 | 28 | |
| 46 | | 37 | 37 | 37 | 37 | 46 | 55 | 63 | 73 | 82 | 91 | 37 | 37 | 37 | 37 | |
| 55 | | 46 | 46 | 46 | 46 | 46 | 55 | 63 | 73 | 82 | 46 | 46 | 46 | 46 | 46 | |
| 63 | | 55 | 55 | 55 | 55 | 55 | 55 | 63 | 55 | 55 | 55 | 55 | 55 | 55 | 55 | |
| 73 | | 63 | 63 | 63 | 63 | 63 | 63 | 63 | 63 | 63 | 63 | 63 | 63 | 63 | 63 | |
| 82 | | 73 | 73 | 73 | 73 | 73 | 55 | 63 | 73 | 73 | 73 | 73 | 73 | 73 | 73 | |
| 91 | | 82 | 82 | 82 | 82 | 82 | 46 | 55 | 63 | 73 | 82 | 82 | 82 | 82 | 82 | 82 | |
| 100 | | 91 | 91 | 91 | 91 | 37 | 46 | 55 | 63 | 73 | 82 | 91 | 91 | 91 | 91 | |
| 109 | | 100 | 100 | 100 | 28 | 37 | 46 | 55 | 63 | 73 | 82 | 91 | 100 | 100 | 100 | |
| 118 | | 109 | 109 | 19 | 28 | 37 | 46 | 55 | 63 | 73 | 82 | 91 | 100 | 109 | 109 | |
| 126 | | 118 | 10 | 19 | 28 | 37 | 46 | 55 | 63 | 73 | 82 | 91 | 100 | 109 | 118 | |
| | 0 | | | | | | | | | | | | | | 126 | |

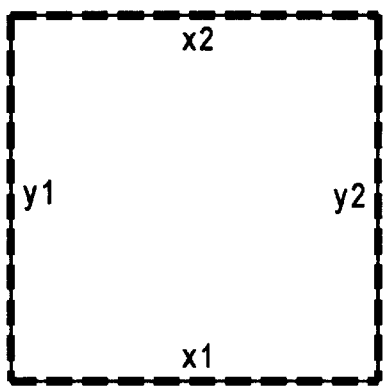
FIG. 54
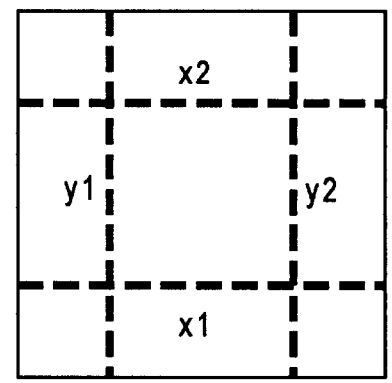
FIG. 55
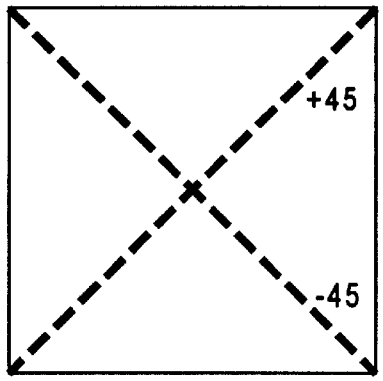
FIG. 56
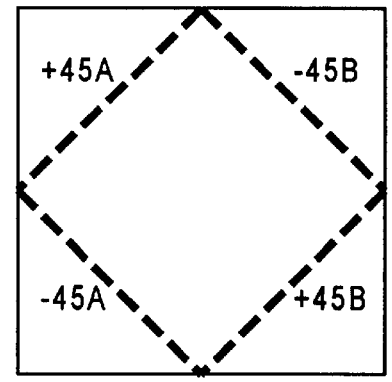
FIG. 57
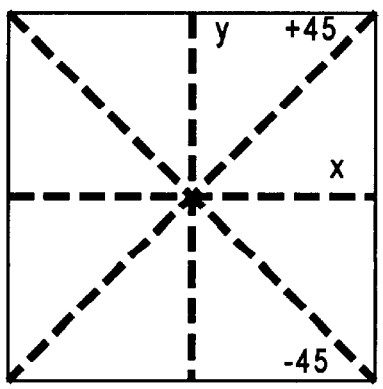
FIG. 58
$$A = \frac{(64-ABS(63-CL1))*CL1 + (64-ABS(63-CL2))*CL2 + (64-ABS(63-CL3))*CL3 + (64-ABS(63-CL4))*CL4}{(64-ABS(63-CL1)) + (64-ABS(63-CL2)) + (64-ABS(63-CL3)) + (64-ABS(63-CL4))}$$
FIG. 59

-trainLookUpTable~700
    -for each of multiple characters to be scan converted~702
        -for each row in scan conversion~704
            -for each pixel in row~706
                -make accurate calculation of pixel's greyscale~708
                -if pixel not all inside or all outside~710
                      -calculate pixel's value of CX and CY~712
                      -add pixel's greyscale to element in trainingTable addressed by the concatenation of CX and CY~714
                      -increment sampleCount~716
    -divide each element of trainingTable by sample count~718

FIG. 60 trainLookUpTablesForStarPixels~700A
    -for each of multiple characters to be scan converted~702
        -for each row in scan conversion~704
            -for each pixel in row~706
                -make accurate calculation of pixel's greyscale~708
                -if pixel is not all inside or all outside~710
                      -calculate pixel's value of CX, CY, C+45, and C-45~712A
                      -add pixel's greyscale to element in trainingTable addressed by the concatenation of CX, CY, C+45, and C-45~714A
                      -increment sampleCount~716A
    -divide each element of trainingTable by sample count~718A

FIG. 61 trainLookUpTablesForMultipleFontSets~700B
    -define font sets~720
    -for each of multiple characters to be scan converted~702
        -for each row in scan conversion~704
            -for each pixel in row~706
                -make accurate calculation of pixel's greyscale~708
                -if pixel not all inside or all outside~710
                      -calculate pixel's value of CX and CY~712
                      -add pixel's greyscale to element in trainingTable addressed by the concatenation of CX and CY for current character's font set~714B
                      -increment sampleCount for current character's font set~716B
    -for each font set~722
        -divide each element of that font set's trainingTable by the font set's sampleCount~718B

FIG. 62

-look-up table algorithm~650B
    -form current look-up address from current pixel's values of CX and CY~652B
    -obtain current pixel's coverage value from the look-up table's entry at current look-up address in the look-up table corresponding to the font set for the current character~654B

FIG. 63

SYSTEM FOR RAPIDLY PERFORMING SCAN CONVERSION WITH ANTI-ALIASING UPON OUTLINE FONTS AND OTHER GRAPHIC ELEMENTS

FIELD OF THE INVENTION

The present invention relates to the scan conversion, or pixel rendering, of outline fonts and other graphic elements with anti-aliasing.

BACKGROUND OF THE INVENTION

Many of the images used to communicate information today are pixel images, that is, images comprised of an array of discrete pixels, or picture elements. Displays on computer screens are normally created using pixel images. In computer displays a pixel normally represents the smallest portion of the display's screen which can be used to show a complete color value. In a monochrome display, a pixel is normally the smallest area the display is capable of illuminating or not. In color displays, a pixel is often the smallest area of the screen which the display can cause to output a composite color. Usually the composite color is formed from sub-pixels, such as a set of red, green, and blue sub-pixels, which are combined to define one full color pixel.

Many printed images are also created as pixel images. In two tone printed images each pixel often represents the smallest mark the printer can make on a piece of paper. In grayscale printed images, a pixel often represents the smallest region on which the printer creates a complete dot pattern having any one of the different grayscale values used to produce grayscale images. In color printed images a full color pixel is created by combining separate grayscale sub-pixels in each of a set of basic colors such as cyan, magenta, yellow, and black.

Many bitmap images are merely displays of information stored in bitmap form having a color value (where color value can represent white or black, a greyscale, or a composite color value) associated with each pixel to be displayed. The computation involved in displaying such bitmap requires little more than moving its pixel values from the bitmap to the portion of computer memory used to represent the screen image. If the display on the screen is at a higher or a lower resolution than that of the given bitmap, all that is required is to re-scale the bitmap to the desired size and to adjust the color values of any partially covered pixels of the resulting image in proportion to the extent they are covered by the re-scaled bitmap.

On the other hand, many bitmap's displayed on computer screens or in printed output are produced from descriptions of shapes to be rendered which are described at a substantially higher resolution than the size of the pixels of bit-mapped image to be displayed. In such cases, an algorithm is required to convert such high resolution descriptions into an appropriate pixel image of the shapes they describe. This is particularly common with, so-called, scalable fonts. Scalable fonts are character fonts, the shapes of which are precisely described at a high resolution in terms of lines and curves. Because of this, the shape of a given character in the font can be displayed over a wide ranges of different sizes merely by expanding or contracting the projection of the character's precise description into a given pixel image.

In this specification and the claims which follow, reference to shapes which are defined at a higher or finer resolution than the resolution of a pixel image refer to shapes with definitions which are capable of specifying the boundaries of such shapes at a resolution higher than that of the pixel image. The high resolution referred to is the resolution of the shape defined, not necessarily that of the points or numbers used in the formula or statement which defines such a shape. For example, one could define an outline font in which all the points used as endpoints or control points in the formula or statement used to describe a character's curves or line segments occur on corners of the pixel grid of a given pixel image. In such a case, the points used to describe the font shape would have the same resolution as the pixel image, but if the character shapes include any curved or diagonal lines, the resolution of the shape described by such lines would be much higher than that of the pixel image.

FIG. 1 illustrates the word "Bitstream" 100, the name of the assignee of the present invention, with the shape of its letters 102 described in a high resolution outline, causing those outlines to appear smooth.

FIG. 2 illustrates how the shapes of the characters 102 in FIG. 1 begin to look more jagged when they are displayed at a pixel resolution lower than the resolution of the outline description.

FIG. 3 is a close-up of the portion of the pixel image of FIG. 2 shown in the dotted box 108. In FIG. 3 individual pixels 110 of the pixel image are shown. The pixels of the image shown in FIG. 3 are arranged in perpendicular rows 112 and columns 114, as is commonly the case in video displays.

In FIG. 3 the letter capital "B" is shown to have three outlines 113A, 113B, and 113C and the letter small "i" has two outlines 113D and 113E.

FIG. 4 shows the outlines 113A–113E in dotted lines superimposed on top of a pixel image corresponding to the shapes defined by those outlines. This pixel image corresponds to the image of "Bi" shown within the dotted box 108 in FIG. 2.

As can be seen from FIG. 4, the process of converting high resolution outlines, such as the outlines 113A–113E, to a lower resolution pixel image often produces images with jagged edges such as the jagged edges 118 shown in FIG. 4.

It is well-known in the prior art that one can make the edges of a pixel images appear to human viewers to be more smooth by using a process known as anti-aliasing. Anti-aliasing is the process of causing pixels which are partially covered by higher resolution shape being rendered to have intermediate covered values, as is shown by the grayscale pixels 120 shown in FIG. 5.

FIG. 6 is identical to FIG. 5 except that it shows the pixel image of FIG. 5 without the grid of individual pixels 110 being shown.

Anti-aliasing commonly seeks to assign a coverage value, also knows as a color or grayscale value, to a partially covered pixel which is proportional to the percent of the pixel which is covered by one or more high resolution shapes. This is indicated in FIG. 7 in which a pixel 110 is shown partially covered by shape 114.

It is possible to take the geometric definition of a shape provided by an outline font description and used geometric methods to calculate the exact percentage of the pixel 110, shown in FIG. 7, covered by that shape. Once this has been done a coverage value corresponding to that percentage can be assigned to the pixel for purposes of anti-aliasing. Unfortunately such computations require a fair amount of processing, which can make rendering a large number of characters with such exactly calculated anti-aliasing undesirably slow. As a result it has been common to calculate the coverage values of partially covered pixels by using approximation.

FIG. 8 illustrates one such approximation method. In this method the curves in the outline description of a shape 114 being rendered are approximated with a series of corresponding linear segments 122. Such an approximation is considerably faster than trying to calculate the exact area of the shape 114.

FIG. 9 shows another prior-art approximation method. This method includes determining for each of an array of points 124 located within the pixel 110 whether or not that point falls within the shape 114 or not. It then assigns a coverage value to the pixel which is a function of the proportion of such points within the pixel which fall within the shape 114 relative to which do not.

FIG. 10 illustrates an approximation method which is been previously used by the inventor of the present application. According to this method, each pixel has associated with it one to five horizontal sampling lines 126 and one to five vertical sampling lines 128. A determination is made for each sampling line of what percent of that line is covered by the shape 114. Then pixel 110 is assigned a coverage value which equals the average of the coverage values for each of the four sampling lines.

The program used in this earlier method allowed OEM's who licensed it to set the number of both horizontal and vertical scan lines to any value between one and five. But the inventor found than using less than the three sampling lines in both directions shown in FIG. 10 tended to product poor results, and, thus, he recommended to such licensees that they use at least three sampling lines in each direction.

All the above methods produce acceptable anti-aliasing for use in pixel images. The approximations described above with regard to FIGS. 8, 9, and 10 normal produce considerable improvements in the speed of rendering anti-aliased images. Nevertheless it is desirable to produce even faster approximation methods for assigning pixel coverage values to partially covered pixels.

SUMMARY OF THE INVENTION

It is an object of the present invention to provide apparatuses, methods, and media for more rapidly assigining pixel coverage values to the pixels of an anti-aliased bitmap image.

It is yet another object of the present invention to provide such apparatuses, methods, and media which provides a fairly accurate assignment of such pixel coverage values given the reduction in computation which they make possible.

According to a first aspect of the invention a computerized method is provided for setting pixel coverage values in a 2-diminsional pixel image for use in human-readable displays. The 2-dimensional pixel image represents a higher-resolution 2-dimensional representation of one or more shapes, such as those of fonted characters or of graphic designs, defined at a finer resolution than the resolution of the pixel image. The pixel image is formed of a plurality of pixels, each representing a corresponding sampling area of the higher-resolution representation and each having a pixel coverage value indicating the extent to which the corresponding sampling area is covered by one of the shapes.

According to this first aspect of the invention, the method performs the following for each of a plurality of the pixels of the image: determining a line coverage value for each of at least two sampling lines running in different directions within the pixel's corresponding sampling area as a function of the degree to which the sampling line is covered by any of the shapes within the sampling area; and determining the pixel coverage value for the pixel as a non-linear function of the line coverage values determined for the two sampling lines.

In many embodiments of this first aspect of the invention, over a majority of the possible different combinations of line coverage values for the two sampling lines running in different directions produced by the method, the rate of change of the pixel coverage value varies more rapidly with variations in the line coverage value of that one of the two sampling lines whose line coverage value is nearest a value associated with one half of the sampling line being covered by such shapes.

In some such embodiments, over a majority of possible different combinations of line coverage values for the two sampling lines, the rate of change of the pixel coverage value varies only in response to the line coverage value of that one of the two sampling lines which is nearest being one-half covered by shapes being rendered.

In other of such embodiments, over a majority of possible different combinations of line coverage values for the two sampling lines, the rate of change of the pixel coverage value varies in response to variations in the line coverage values of both of the two sampling lines.

In some embodiments of this first aspect of the invention the non-linear function used to determine pixel coverage values determines those value by looking up a value in a look-up table at a location addressed as a function of the line coverage values of the two sampling lines. The values in the look-up table for a given combination of line coverage values can be derived from a plurality of pixel coverage value calculations made by a more computationally accurate and intensive method in prior situations in which a pixel had a corresponding combination of line coverage values.

Where the shapes being rendered are characters in different sets of fonts, different look-up tables can be used to determine the pixel coverage value when rendering characters from the different sets of fonts.

In some embodiments of this first aspect of the invention the non-linear function determines a pixel coverage value as a function involving a weighted sum of the line coverage values of the two sampling lines running in different directions. In this weighted sum, the contribution of each of the two line coverage values is a function of how close each such line coverage value is to an intermediate line coverage value.

In some embodiments of this first aspect of the invention the two sampling lines running in different directions are at right angles to each other. In some such embodiments the pixel image is comprised of pixels arranged in rows and columns, and the coverage values are determined for only two sampling lines in each pixel, one sampling line extending in substantially in the middle of each pixel row and one sampling line extending in substantially the middle of each pixel column.

In many embodiment of this first aspect of the invention the shapes being rendered are described by outlines which define the shapes at a higher resolution than the pixel resolution of the pixel image, and the line coverage values are determined as a function of the distance between intersections of shape outlines and the sampling lines.

According to a second aspect of the invention, a computerized method for creating a 2-diminsional pixel image for use in human-readable displays is provided which uses two pixel setting passes. The pixel image represents a higher-resolution 2-dimensional representation of one or more shapes defined at a finer resolution than the resolution of the pixel image. The pixel image is formed of a plurality of pixels, each representing a corresponding sampling area of the higher-resolution representation and each having a pixel coverage value indicating the extent to which the corresponding sampling area is covered by one of the shapes This second, two-pass, aspect of the invention includes the following: calculating the intersections between the shapes and a first set of parallel sampling line running in a first direction in the higher-resolution representation; calculating the intersections between the shapes and a second set of parallel sampling line running in a second direction, different than the first direction, in the higher-resolution representation; and performing a first and a second pixel setting pass.

The first pixel setting pass includes calculating a pixel coverage value for each pixel by: determining the line coverage values of the one or more sampling lines of the first set in the pixel's sampling area as a function of the degree to which such sampling line are covered by any of the shapes within the sampling area; and then determining the pixel coverage value for the pixel as a function of such line coverage values.

The second pixel setting pass is performed after the first and it only changes pixel coverage values set in the first pass for pixels presenting a sampling area in which one or more of the intersections between the shapes and the second set of sampling lines have been calculated. The second pass changes the pixel coverage value of a pixel in which such an intersection has been calculated by: determining the line coverage values of the one or more sampling lines of the second set in the pixel's sampling area as a function of the degree to which such sampling line are covered by any of the shapes within the sampling area; and then determining the pixel coverage value for the pixel as a function of the line coverage values calculated for the pixel in the first pass and the line coverage values calculated for the pixel in the second pass.

In some embodiments of this second, two-pass, aspect of the invention the pixel image is comprised of a series of pixel rows stored in a memory at sequential addresses, and each pixel row includes a series of pixel coverage values stored in the memory at even more closely spaced sequential addresses. In such embodiments the first pixel setting pass is performed for sampling lines which extend in the direction of such pixel rows. In many such embodiments, the pixel image is comprised of a two dimensional array of pixels, and the first and second directions correspond to the two dimensions of the array.

In some embodiments of this two-pass aspect of the invention the second pixel-setting pass causes the pixel coverage value for a pixel to be determined as a non-linear function of the line coverage values of sampling lines running in the first and second directions. In this non-linear function the rate at which the pixel coverage value changes as a function of the rate of change in a given line coverage value varies as a function of the line coverage value itself.

According to a third aspect of the invention a two-pass method for creating a 2-dimentionsal pixel image is provided which is similar to the two-pass method of the second aspect of the invention. According to this third aspect of the invention the shapes being rendered are character-font shapes defined by outlines at a finer resolution than the resolution of the pixel image and the pixels of the image are arranged in rows and columns. The first set of lines run along pixel rows and the second set run along pixel columns. The method advances around each outline of a character-font shape being rendered to find each intersection between that outline and the row and column lines. Each such intersection found is placed in an ordered intersection list associated with the sampling line with which the intersection occurred, with the order of intersections in the list reflecting the order of the intersection along the list's associated sampling line.

The first pixel setting pass of the third aspect of the invention includes a loop performed for each pixel row. In this loop, for each pixel in the row if there is no intersection in the list associated with the row's sampling line which occurs within the pixel's sampling area, the pixel is set to a pixel coverage value corresponding to the sampling line's current line coverage state, either all covered or all uncovered. Otherwise the following steps are taken: 1) the sampling line's current line coverage state is changed to reflect each of one or more successive intersections in the intersection list which occurs within the pixel's sampling area; 2) a row line coverage value is calculated as a function of the percentage of the row sampling line within the pixel's sampling area which is covered by any character-font shapes; and 3) the pixel is set to a pixel coverage value determined as a function of the row line coverage value calculated for the pixel.

The second pixel setting pass performed in the third aspect of the invention after the first pixel setting pass, includes a loop performed for each pixel column with any intersections in its associated intersection list. In this loop, for each pixel in the column having an intersection in its intersection list which occurs in the pixel's sampling area the following steps are performed: 1) changing the column sampling line's current line coverage state to reflect each successive intersection in the intersection list within the pixel's sampling area; 2) calculating a column line coverage value as a function of the percentage of the column sampling line within the pixel's sampling area which is covered by the character-font shape; and 3) setting the pixel's pixel coverage value as a function of the row line coverage value calculated for the pixel in the first pixel-setting pass and the column line coverage value calculated for the pixel in the second pixel-setting pass.

In many embodiments of this third aspect of the invention the function used to set pixel coverage values in the second pixel-setting pass is a non-linear function in which, over a majority of possible different combinations of row and column line coverage values, the rate of change of the pixel coverage value varies more rapidly with variations in the line coverage value of that one of the pixel's row or column sampling lines is nearest being one half covered by the shapes being rendered.

According to yet other aspects of the inventions, computer systems and computer programming stored in computer readable memory are provided which perform methods of the type described above.

BRIEF DESCRIPTION OF THE DRAWINGS

These and other aspects of the present invention will become more evident upon reading the following description of the preferred embodiment in conjunction with the accompanying drawings, in which:

FIG. 1 illustrates a relatively high resolution description of a series of shapes, in this case the shapes of a portion of text defined by an outline font;

FIG. 2 illustrates the same shapes when rendered in a lower resolution pixel image;

FIG. 3 is a close up of the portion of the bitmap shown in FIG. 2, showing the individual pixels of that bitmap with the outline of the characters it renders overlaid on the pixels;

FIG. 4 is similar to FIG. 3, except that it shows the character outlines in dotted lines and it shows those outlines laid over the actual image of the bitmap;

FIG. 5 is similar to FIG. 4 except it shows the bitmap image afte it has been anti-aliased.

FIG. 6 is similar to FIG. 5 except that it shows the anti-aliased bitmap image without the distraction of the pixel grid shown in FIG. 5.

FIG. 12 is a highly simplified pseudo-code description of one of the methods by which the present invention assigns pixel coverage values to pixel images;

FIGS. 13 through 32 are used to describe how the coverage values of a medial horizontal and medial vertical sampling line can be used to calculate the coverage value of a pixel according to an aspect of present invention;

FIGS. 33 through 36 are highly simplified pseudo-code descriptions of a two-pass method of rendering a pixel image of text in which the shapes of individual characters have been defined using outline fonts;

FIGS. 37 through 40 illustrate formula's or methods which can be used by the two-pass method of FIGS. 33–36, as well as other pixel setting schemes, to determine the appropriate pixel coverage values in pixel images as a non-linear function of coverage values of both the vertical and horizontal sampling lines of a pixel;

FIGS. 44 through 51 help illustrate the operation of the two-pass method of FIGS. 33 through 36 when the binary pixel setting formula of FIG. 39 is used;

FIG. 52 is a table of pixel coverage values calculated for pixels having different x and y line coverage values according to the formula of FIG. 39;

FIGS. 54 through 58 illustrate a few of the many other possible arrangement of sampling lines which can be used with the present invention;

FIG. 59 illustrates one of many non-linear functions which can be used to calculate pixel coverage values from arrangement of sampling lines such as those shown in FIGS. 54 through 58;

FIGS. 60–62 illustrate methods for training look-up tables for use in determining pixel coverage values; and FIG. 63 illustrates a method for determining pixel coverage values which can be used with the look-up tables trained by the method of FIG. 62.

DETAILED DESCRIPTION OF PREFERRED EMBODIMENTS

Figure 11:
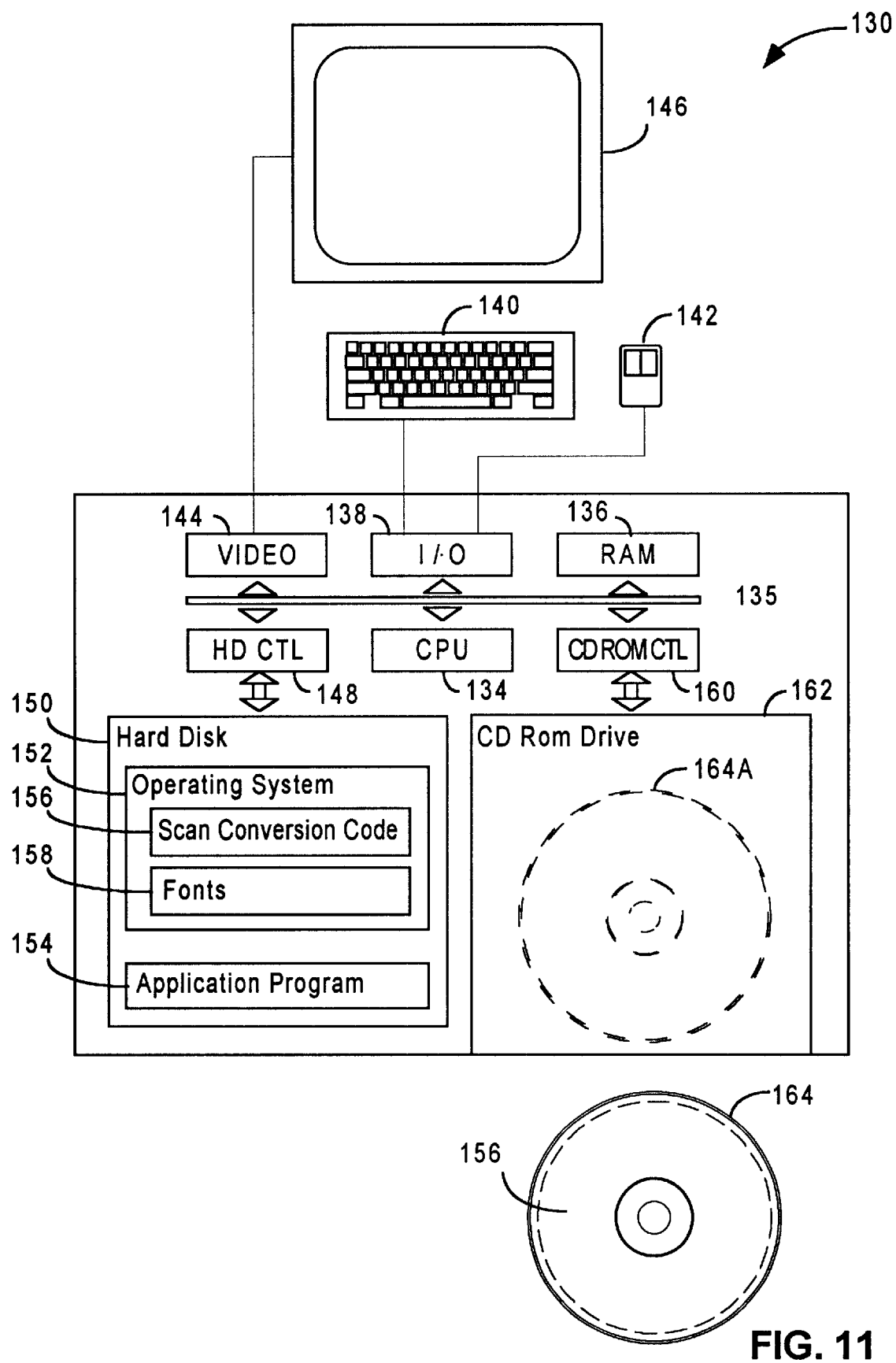
FIG. 11 illustrates one of many possible computer systems capable of performing the present invention.

FIG. 11 provides an overview of a computer system 130 which is one of many possible types of computer system embodying the present invention.

The system 130 includes a computer 132 which has a CPU 134 for executing instructions stored in a random access memory (or "RAM") 136. The random access memory 136 also stores data values to be used by the CPU 134. The computer further includes an input/output (or "I/O") interface 138 which is designed for interfacing between the CPU and I/O devices, such as the keyboard 140 and the mouse 142. A video interface 144 provides the electronic output necessary to create in image on the screen of a video monitor 146. A hard disk controller 148 interfaces between the CPU and a hard disk 150. The hard disk 150 stores programs and data to be used by the computer, including an operating system program 152 and one or more application programs, such as the application program 154 shown in FIG. 11.

The operating system includes scan conversion code 156 for rasterizing high resolution shapes such as the shapes of fonted scalable fonts. The rasterizing code 156 in the system 130 includes aspects of the present invention which allows it to perform anti-aliased rasterization with less computation and, thus, at a greater speed, than most anti-aliasing rasterization code in the prior art.

The operating system also stores fonts 158 which defined the outlined shapes of scalable fonts of the general type described above.

The computer 132 also includes a CD-ROM controller 160 which interfaces between the CPU 134 and a CD-ROM drive 162. The CD-ROM drive is cable of reading CD-ROMs, such as the CDROM 164 illustrated in FIG. 11, when such CD-ROMs are inserted into the CD-ROM drive, as indicated by the dotted lines 164A in FIG. 11.

A bus 135 connects the CPU 134 to the RAM 136, the I/O controller 138, the video controller 144, the hard disk controller 148, and the CD-ROM controller 160, allowing all these devices to communicate with each other.

The scan conversion code 156, which embodies aspects of the present invention, can be recorded on any sort of memory device, such as the CD-ROM 164, as well as virtually any other mass storage devices, such as floppy disks, removable hard drives, and digital flash ROM. Once such programming code has been entered into a computer 132, it is traditionally stored on the hard disk or other mass storage device used by the computing system, as is indicated in FIG. 11. Once stored on the computer's mass storage device, the programming is also loaded into the random access memory 136 when it is actually being used so that the CPU 134 can execute its instructions and perform scan conversion according to present invention.

Figure 10:
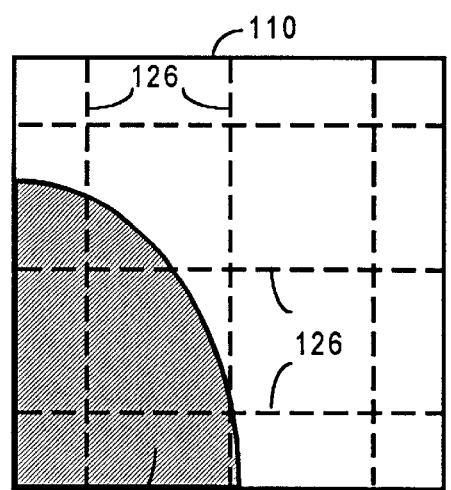

FIGS. 13 through 32 illustrate a pixel 110 similar to the pixel 110 shown in FIG. 10 except that, instead of having three horizontal sampling lines 126 and three vertical sampling lines 128, the pixels in FIGS. 13 through 32 have only one horizontal sampling line 164 and one vertical sampling lines 166.

These figures show how using only two sampling lines can cause considerable inaccuracies if one seeks to set the coverage for a pixel to the average of the percentage of coverage of its sampling lines, as was done in the system described above with regard to FIG. 10.

For example, if one looks at FIGS. 13 through 16, one can see that if the portion of pixel which is covered by a shape 166 having a horizontal top edge 168 moves upward in a vertical direction, the average percentage of the two sampling lines 164 and 166 which are covered makes a large jump as the top edge 168 of the shape crosses over the horizontal sampling lines 164. This is because at the point that the top edge 168 crosses the line 164, a very small increment in the proportion of the pixel which is covered causes the entire line 164 to go for being totally uncovered to being totally covered. If pixel coverage value were calculated as the average of line coverage values, as described with regard FIG. 10, the pixel coverage value would jump from being approximately one quarter in FIG. 14 to over three quarters in FIG. 15, a change of almost 50%, even though the actual percent of the pixel which is covered had change by only a small percent.

This inaccuracy tends to cause the resulting anti-aliasing to do a relatively poor job of producing edges which appear to the human eye as being smooth when there are only two sampling lines per pixel.

FIGS. 17 through 20 are similar to FIGS. 13 through 16, except that they illustrate a shape 170 with a vertical edge 172 moving in a horizontal direction across a pixel.

FIGS. 18 and 19 show how a relatively small movement in the vertical edge 172 between the positions shown in FIGS. 18 and 19 can cause an improperly large jump in the average percentage of coverage of the horizontal and vertical sampling lines 164 and 166.

In attempting to figure out a solution to this problem, the present inventor has discovered that calculating pixel coverage values as a non-linear function of the coverage values of the horizontal and vertical sampling line 164 and 166 can produces more accurate estimates of coverage values. It does because it can do away with the large discontinuities in pixel coverage value, described above, created by small changes in the percent of the pixel which is covered when the pixel coverage value is calculated as a linear function of the two sampling values, such as an average of those values. This is because in most of the types of partial pixel coverage which result when rendering shapes which have features which are relatively large relative to an individual pixel, those of sampling lines running in different directions which have the more intermediate coverage value usually have a coverage value which is closer to the coverage value of the entire pixel than sampling line running in other directions which have more extreme coverage values. A non-linear function allows the contribution of the various line coverage values to vary as a function of those line coverage values themselves.

FIG. 12 is a highly schematics pseudo-code description of an algorithm 190 within the scan conversion code 156 shown in FIG. 11. This algorithm calculates a given pixel's coverage values as a non-linear function of sampling lines running in different directions in the given pixel. This algorithm causes steps 192 through 196 to be performed for each partially covered pixel in the image to rendered.

Step 192 calculates the degree of coverage of one or more sampling lines which run and in first direction (such as a horizontal direction) within a given boundary pixel. Then step 194 calculates the degree of coverage of one or more sampling lines which run in a second direction (such as a vertical direction) within the pixel. Then step 196 calculates the pixel's coverage, or grayscale, value as a nonlinear function of the coverage values of the lines running in different directions.

In many embodiments of the general algorithm shown in FIG. 12, the nonlinear function used in Step 196 is one which causes the coverage value assigned to the pixel to value to vary more rapidly with changes in the coverage value of that one of the coverage lines which has the most intermediate coverage values.

For example in FIG. 13 it can be seen that the coverage value of the vertical sampling line 166 provides a much better indication of the percent of the pixel 110 which is covered than the horizontal sampling line 164. In this case the sampling line 166 has a coverage value which is closer to representing one-half coverage than does the sampling line 164, which is totally uncovered. The same is true in FIGS. 14 and 15.

In FIG. 15, the pixel is only a little more than halfway covered and its coverage value equals the coverage value of the vertical line 166. The horizontal sampling line 164 is totally covered and, thus, its coverage value does not accurately represent the coverage value of the pixel as a whole. In this case giving more weight to the coverage value of the horizontal line which is closer to being ½ covered than to the coverage value of the horizontal sampling line which is totally covered provides a more accurate estimate of the pixel's coverage. The same is true, although less so the case of FIG. 16.

The rational for giving greater weight to the most intermediate line coverage described for FIGS. 13 through 16 similarly applies to FIGS. 17 through 20, except that in those cases it is the horizontal line 164 which has the more intermediate coverage values and provides the best estimate of the coverage value of the entire pixel.

FIGS. 21 through 24 illustrate a relatively long thin rectangular shape 174, which extends in a vertical direction, placed in different positions relative to the pixel 110.

When the shape 174 has the position shown in FIG. 21, it does not cover any of either of the two sampling lines 164 and 166. Thus, the coverage value calculated for the pixel will be 0. This is a mistake of approximately 25 percent, since approximately one-quarter of the pixel actually is covered in this case, but the present inventor has found that such an error is normally not terribly noticeable to the human eye when a shape is only extending into one corner of a pixel.

In the case shown in FIG. 22 the top of the shape 174 barely extends across the horizontal line 164 and covers a little less than one half of that line. It doesn't extend across any of the vertical line 166. In this case it is normally correct to give the more intermediate coverage value of the horizontal line more weight than the zero coverage value of of the vertical sampling line, since, assuming the shape 174 is large relative to the pixel 110, it is likely that the actual coverage value of the pixel will be closer to the more intermediate coverage value.

FIG. 23 shows a situation where the long thin shape 174 covers substantially all of the vertical line 166 and approximately only one-half of the horizontal line 164. In this case the more intermediate coverage value on horizontal line 164 provides a more accurate estimate of the coverage of the entire pixel than does the more extreme coverage value on the horizontal sampling line 166.

FIG. 24 shows another case where the more intermediate coverage value provides a better representation of the actual percentage of the entire pixel which is covered than the more extreme zero coverage value.

FIGS. 25 through 28 illustrate a shape 176 having an edge 178 with a 45 degree angle at various locations relative to the pixel 110. In this case it can be seen that the values of the two sampling lines, the horizontal sampling line 164 and vertical sampling line 166 will normally have almost exactly the same value. When this is true their coverage values will be equally intermediate, and should contribute equally toward determining the coverage value of the entire pixel.

FIGS. 29 through 32 represent the pixel 110 as a shape 180 having an edge 182 with a steep angle is located at different positions relative to that pixel.

In FIG. 29 neither the horizontal nor vertical sampling lines are at all covered by the shape. In that case the pixel 110 will be assigned coverage value 0. Note that in this case the error is much less than in FIG. 21.

In FIGS. 30 and 31 the horizontal sampling line 164 has the most intermediate coverage value, and its value will be given greater weight in determining the pixel's coverage value. This is appropriate since the coverage value of the horizontal line 164 equals the actual coverage of the pixel 110.

In FIG. 32 the horizontal sampling line 164 again has the most intermediate coverage value, and, again, it is appropriate that the sampling line with the more intermediate coverage value be a given more weight in determining the coverage value for the entire pixel.

FIGS. 33 through 40 are highly simplified pseudo-code representations of one of many possible embodiments of the scan conversion code 156 shown in FIG. 11.

The pseudo-code in FIGS. 33 through 40 describes a two-pass program for calculating the pixel coverage values of a bitmap representation of a character which is to be drawn upon a computer screen or printed upon some printable media. The highest level of this program is represented by the drawText routine 200 shown in FIG. 33. This routine creates a pixel image from one or more lines of text in which the character shapes are described by high resolution outlines of the type described above with regard to FIGS. 1–5.

As shown in FIG. 33, the drawText routine 200 includes a loop 202 which is performed for each character in a bitmap to be rendered. The two-pass procedure of the drawText routine of FIG. 33 is performed within each iteration of the loop 202. This procedure performs a first, x, pass and then a second, y, pass. In the x pass, which is performed largely by loop 206 of FIG. 33, a coverage value is assigned each pixel of the bitmap 250 by the XLinePass routine of FIG. 35. This pixel coverage value is simply the coverage value of the x sampling line which runs through the pixel. In the y pass the pixel values set in the first pass are only changed for those pixels in which a y intersection occurs, greatly reducing the computation in such a pass. In pixels with y intersections the pixel's coverage value is determined as a function of the coverage values of both the pixel's x and y sampling lines.

This two-pass loop 202 comprises the steps 204 through 222.

The step 204 calls a charSetUp routine 224, shown in FIG. 34, for the current character of the loop 202. This charSetUp routine performs the preparatory steps necessary before performing the x-pass and y-pass of the program's two-pass procedure upon a given character to be rendered.

Figure 41:
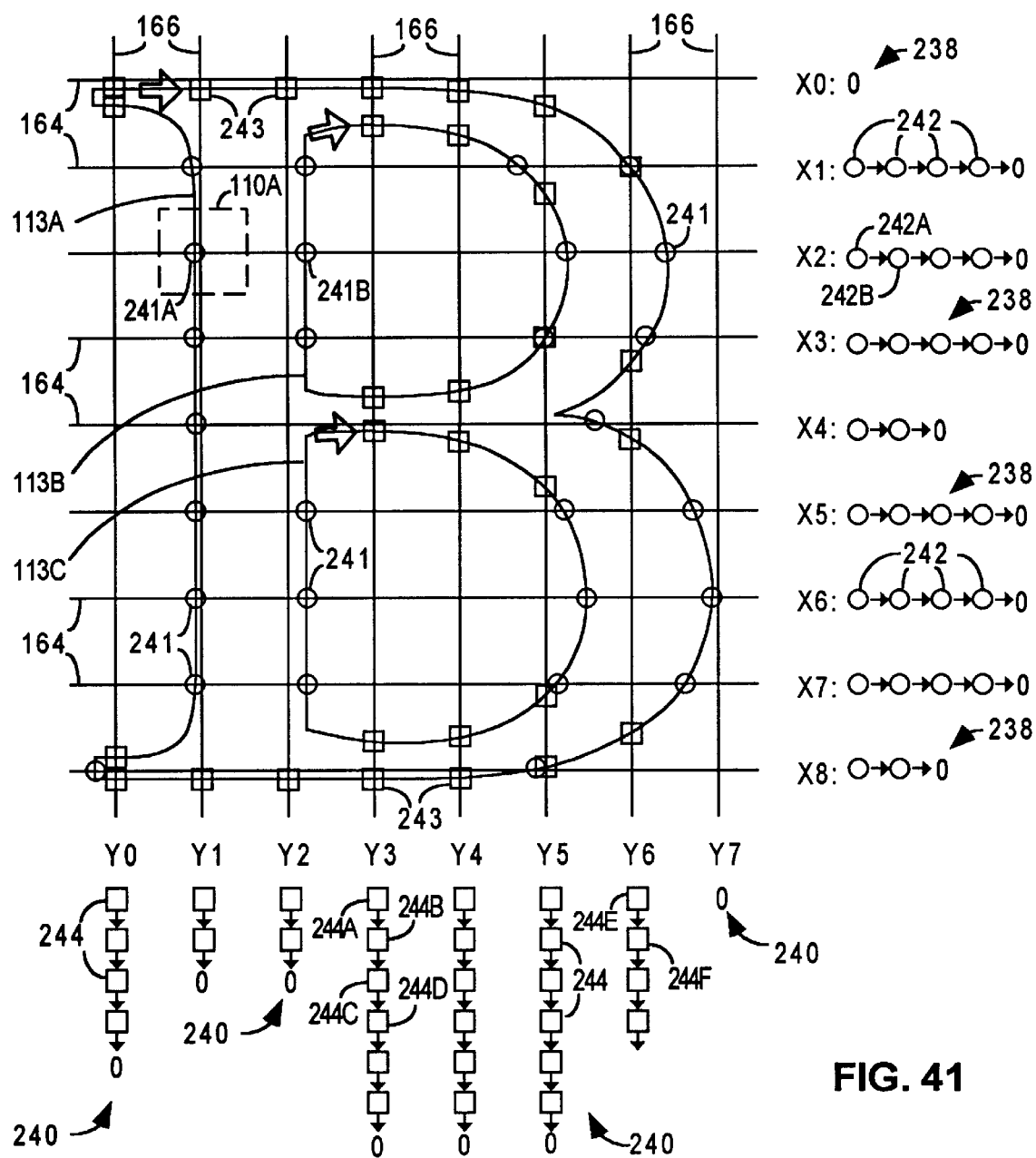
FIG. 41 helps illustrates how intersection lists are prepared by the algorithm of FIG. 35 for each horizontal and vertical sampling line in a bitmap image created for a character.

The charSetUp routine performs a loop 226 for each of a character's outlines 113. This is illustrated in FIG. 41 in which the capital letter "B" shown in that FIG. has three outlines 113A, 113B, and 113C. For each such outlines the loop 230 is performed until the processing of that outline is complete.

The loop 230 comprises steps 232, 234, and 236. Step 232 advances around the current outline of the loop 230 until the next intersection 241 or 243, shown in FIG. 41, between that outline and a horizontal or vertical medial sampling line 164 or 166, respectively, is reached. In the embodiment of the invention currently being used by the inventor, in step 232 curved portions of the outline are approximated with a sequence of short line segments. Intersections between the outline and a medial line are found as intersections between the medial line and the straight lines used to approximate the curve. Other embodiments of the invention could use other approximation methods or could do the extra computation to find the exact intersection between outline curves and medial lines.

Each time an intersection 241 or 243 is reached, step 234 decides which x or y medial line the intersection is in. Then step 236 places a representation 242 or 244 of the intersection in a proper position within a linked list associated with the intersection's x or y line, respectively. This is indicated in FIG. 41, in which the linked lists 238 labeled X0 through X8 are associated with horizontal medial sampling lines 164 and linked lists 240 labeled Y0 through Y7 are associated with vertical medial sampling lines 166.

Each intersection representation 242 or 244 includes the x or y position of its intersection with a horizontal or vertical sampling line, respectively. Each such representation also includes the intersection's edgeValue, which has a value of positive or minus one. As is done in prior art scan conversion systems using a winding count, the edge value of each intersection is be determined by whether the path around the outline appears to be traveling to the right or left when viewed from the direction in which the intersection is occurring with the outline.

In the embodiment of the invention being described, the x and y positions along a given x or y sampling line are store with 32 bits of precision, with twenty-six bits representing the number of the pixel along the sampling line, and the least significant six bits representing the position along the sampling line within a given pixel. These six bits can be used to define sixty-four gradations of length, from zero to sixty-three, within a pixel. The coverage values are calculated from these sixty-four gradations, multiplied by two, so the coverage values can be viewed as varing by even numbers from zero to one hundred and twenty-six.

It can be seen by looking at FIG. 41 that once the process of the loop 230 has been performed for each of a character's outlines, each sampling line associated with the character will have a linked list with a representation of each intersection between that sampling line and the outlines of the character, with the intersections in each linked list being placed in their proper order along the sampling line.

Returning to FIG. 34, once the loop 320 has been performed for each of a character's outlines 113, the loop 226 is complete and then steps 246 and 248 are performed. Step 246 forms a grayscale bitmap large enough to hold a pixel coverage value for each of the pixels through which the x and y sampling line 164 and 166 run.

Figure 42:
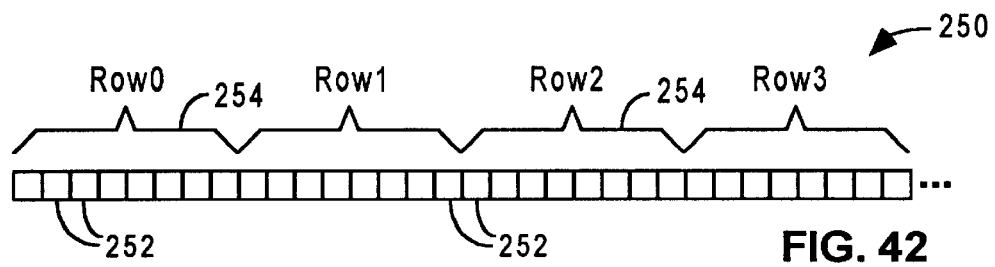
FIG. 42 illustrates how a bitmap image created for a character can be stored in memory.

FIG. 42 illustrates such a bitmap 250. This bitmap is comprised of a plurality of individual pixels 252 which are arranged rows 254. Each row 254 represents all of the pixels associated with a given x sampling line within the character being represented. In the embodiments of the invention being described, the coverage value of each pixel is represented by a number between zero and one-twenty-six, allowing each pixel to the represented by one byte.

Once the step 246 of FIG. 34 has been performed, a step 248 sets the values of all of the bitmap's elements to zero.

At this point the operation of charSetUp routine is complete for a given character.

Returning now to FIG. 33, once the call to charSetUp in step 204 returns to the drawText routine, a step 206 performs a loop for each x, or horizontal, line 164 associated with the character being rendered by the loop 202. Loop 206 comprises the steps 208 to 212.

Step 208 points a pointer fillStart to the first intersection representation 242 on the current x line's linked list 238. For example, if the loop 206 were being performed for the x line having the linked list labeled X2 in FIG. 41, fillStart would be pointed to the intersection 242A shown in FIG. 41.

Then step 210 points a pointer fillEnd's to the second intersection representation in the current x line's linked list. When the loop 206 is being performed for the x line having the linked list X2 in FIG. 41, this would cause the fillEnd's pointer to be pointed to the node 242B.

Once these two steps have been performed, Step 212 calls a routine XLinePass 254.

FIG. 35 show that the XLinePass routine. It has a step 256 which zeros a windingCount variable. As those skilled in the art of rasterizing characters will understand, a winding count is used to keep track of whether or not a portion of the area associated with a character being rendered is inside or outside of a character.

Next a loop 258, called the XLineLoop in FIG. 35, is executed until the processing of the x sampling lines for which the routine XLinePass has been called is complete. The XLineLoop is comprised of the steps 260 through 304.

Step 260 sets a variable currentpixel# to the number of the pixel in which fillStart's associated intersection is located. For example, if the XLinePass has been called for the line having the linked list labeled X2 in FIG. 41, the step 260 would set currentpixel# to the number of the pixel 110A shown in FIGS. 41 and 43 having the intersection 241A which corresponds to the first element 242A in the linked list 238. Then a step 262 adds the edgeValue of the intersections 241 pointed to by fillStart and the fillEnd's Intersection to the windingCount variable.

When fillstart and fillEnd are point to intersection representations 242A and 242B in the linked list X2, the edgeValue of intersection representation 242A is one, because it represents an intersection which marks a change from being outside of a figure to being inside the figure. Adding this edgeValue to the windingCount which was previously zero would set the windingCount to one.

The edgeValue of the intersection representation 242B is minus one, since it represents an intersection which goes from being inside a figure to being outside the figure. After adding this edgeValue, the windingCount would be zero indicating that the distance between the intersections represented by fillStart and fillEnd is a length of a medial line which is covered by a shape being rendered.

Once step 262 is complete, step 264 performs a loop while the winding count is not 0. In the case just discussed this loop would not perform any steps since the windingCount would already be zero. But, it is possible when performing windingCount calculations to have different parts of a character's shape overlap, so that a medial line might pass through multiple pairs of associated plus one and minus one intersections before completing the transition from being outside of a shape to again being outside of the shape. In simple character shapes such as that of the capital "B" shown in FIGS. 41 and 43 there are no such overlapping portions.

In characters with overlapping shapes the loop 264 would advance along the current linked list's intersections, having step 266 set fillEnd's Intersection to the next intersection in the current linked list, and having step 268 add fillEnd's corresponding edgeValue to the windingCount until the windingCount reached to zero.

Once the program reaches step 270, the distance between the current fillStart and fillEnd represents a continuous portion of the current x line which is covered by the character being rendered bounded by portions of the x line which are not so covered.

At this point step 270 tests to see whether fillEnd's position is within the pixel having the currentPixel#. If so, step 272 adds the distance between the position of fillEnd and fillStart's intersections to the current pixel, that is the pixel in the bitmap 250 shown in FIG. 42 having the pixel number contained in currentpixel#. This is done because, in such a case, the distance between fillEnd and fillStart's intersections should be added to the pixel coverage value of the current pixel.

If the test of step 270 finds that fillEnd's intersection is not located in the current pixel, the else statement 274 causes steps 276 through 294 to be performed.

Step 276 adds to the current pixel's coverage value the distance between fillStart's position and the right edge of the current pixel. This is done because in cases where the test of step 274 is not met, the distance between fillStart and fillEnd's positions runs across more than one pixel, and, thus, it requires contributions to the individual x line coverage values of each individual pixels across which its covered distance spans.

After step 276 has added the distance between fillStart's intersection and the right edge of the current pixel to the corresponding bitmap element in the bitmap 250 shown in FIG. 42, step 278 increments the currentPixel# so that it will point to be next pixel along the current x line for which XLinePass 254 is being performed.

Once this is done, a step 280 test to see if the fillEnd's intersection is located in a pixel having a pixel number greater than currentpixel#. If this is the case, steps 282 through 292 are performed.

Step 282 tests to see if the address of the current pixel is an odd number. If so, steps 284 and 286 are performed. Step 284 sets the current pixel to the value 126, indicating that the current pixel is entirely covered. Then step 286 increments currentPixel# by one.

After steps 282 through 286 are performed, the current pixel will have an even numbered address. Then a loop 288, comprised of steps 290 and 292, is performed while the currentpixel# is less than the pixel number in which fillEnd's intersection occurs. Step 290 uses a two byte write instruction to write two successive values of 126 to the bitmap starting with currentpixel#'s pixel. Then step 292 increments the currentpixel# by two.

Loop 288 continuous until the currentpixel# equals or is one greater than the number of the pixel in which fillEnd's intersection occurs. Once this has been done, step 294 is performed. It sets the pixel corresponding to fillEnd's pixel to a coverage value equal to the distance between the left edge of fillEnd's pixel and the position of fillEnd's intersections.

Once this is been done, step 296 tests to see if there are any more intersection in the linked list of the current x line after that pointed to by fillEnd. If so, steps 298 and 300 point fillStart and fillEnd to the two next intersections in the current linked list, respectively. This prepares the program to perform another iteration of the XLineLoop 258, starting with the intersections pointed to by the new values of fillStart and fillEnd.

If, however, the test 296 finds that there are not anymore intersections represented in the current x line's linked list, step 302 causes step 304 to break from the XLineLoop 258 and to terminate the processing of the XLinePass 254. This is done because, if there are no more intersections in the current x line's linked list, all the intersections on the list had been processed and all the covered portion of that x line will have made their appropriate contributions to the corresponding pixels in the bitmap 250 of shown in FIG. 42 for the x pass of the two pass process.

Returning to FIG. 33, once the call to XLinePass in step 212 has returned, step 214 will start the second pass of two-pass process used in the drawtext routine 200. This second pass includes a loop 214 which is performed for each y sampling line 166, shown and FIG. 41, associated with the character being rendered by an iteration of the loop 202. The loop 214 includes steps 216 through 220.

Step 216 points a fillStart pointer to the first intersection in the linked list 240 of the y line for which the loop 214 is being performed. For example, if the y line having the linked list Y3 in FIG. 41 were the current line, fillstart would be pointed to be first y intersection 244A shown in FIG. 41.

Once this is done, step 218 points the fillEnd's pointer to the second intersection on the y line's linked list. In the case just cited, this would be the y intersection 244B shown in FIG. 41.

Once fillstart and fillEnd point to the first two intersections in the current y line's linked list, step 220 calls the YLinePass routine 306 for that current y line.

FIG. 36 illustrates the YLinePass routine. This routine is different from the XLinePass 254 shown in FIG. 35 in that it only alters the pixels 252 of the bitmap 250 of FIG. 42 in which there are one or more intersections between a y sampling line and the outline of the character being rendered. This saves computation, particularly when characters are rendered in a relatively large size, because it limits the more complex calculation of pixel coverage values in the second pass to just pixels occurring at the edge of a character's shape.

The YLinePass 306 starts with a step 308 which corresponds to the step 256 of FIG. 35. This step zeroes the windingCount variable. Then step 309 zeros a variable CY, which represents the y line coverage value currently being calculated for a pixel. Next a step 310 sets a pendingPixel# variable 280 to a NULL value, that is, a number indicating that the pendingPixel# does not currently represent an element of the bitmap 250 of FIG. 42. Next a YLineLoop 312 is performed until all of the intersections 244 on the current y line's linked list have been processed. The YLineLoop consists of steps 314 through 362.

Step 314 adds the edgeValues of fillStart and fillEnd's intersections to the windingCount. This is equivalent to step 262 describe above with regard to FIG. 35. In most cases, during the first iteration through YLineLoop 312 fillStart will point to the first intersection in a y line's linked list and fillEnd's Intersection will point to the second intersection in this list. For example, if the y line having the linked list Y3 shown in FIG. 41 is being processed when the YLineLoop 312 is first entered, fillStart and fillEnd will point to intersection 244A and 244B, respectively.

If fillStart's intersection starts a continuous portion of a y line which is covered by a shape and fillEnd's intersection ends that covered portion, the windingCount will equal zero once the positive and minus one edgeValues of those two intersections are added to the windingCount in step 314. Except when a shape is composed of overlapping subshapes, this will always be the case.

In those case where the windingCount is not zero, step 316 will cause step 318 to point fillEnd's to the next intersection in the current y line's linked list and step 320 to add the edgeValue of that new intersection to the windingCount. Steps 318 and 320 will be repeated until the windingCount equal zero, at which point the distance between fillStart and fillEnd's intersections will represent an isolated continuously covered portion of the current y line.

Once the windingCount equal zero, step 322 tests to see if pendingpixel# currently identifies a pixel in the bitmap. If pendingPixel# does represent a pixel and if fillStart' intersection falls outside that pending pixel, steps 324 through 330 are performed. Step 324 sets the variable CX, which represents x line coverage of pending pixel to the pending pixel's coverage, or grayscale, value which was previously set in the x pass the two-pass procedure of loop 202 of FIG. 33.

Then step 326 calculates the coverage value for the pending pixel as a non-linear function of both the CX and CY variables, where CY represents the coverage value of the y line within the pixel. It can do so according to any number of different formulas, including the formulas shown in FIGS. 37 through 40. The formulas of FIGS. 37 through 39 all cause the pixel coverage value calculated to depend more heavily upon the line coverage value of the sampling line, either the x or y sampling line, which has a coverage value closest to representing 50 percent coverage in the current pixel. In these formula the pixel, and line coverage values all range between zero and 126. Thus, the values of 63 and 64 shown in those formulas represent a coverage value of substantially one half.

One of the simplest of these formulas is that shown and FIG. 39. This formula is a binary formula which sets the coverage value of a pixel equal to the coverage value of either its x or y sampling line, selecting that one of those two values which most closely represents 50% coverage. For a pixel in which the x and y coverage values are equal, it selects CX for the coverage value of the pixel, but since, in such as case CX equals CY, it is, in effect, setting the coverage value equal to the values of CX and CY. In some alternate embodiments of the invention, the binary formula described in FIG. 39 is modified so that if CX and CY are on opposite sides of the intermediate value of 63, but are of equal, or substantially equal, distance from it, the pixel coverage value will be set to the intermediate value of 63, rather than to the value of either of the two coverage values.

Once step 326 has used a non-linear function to calculate a coverage value for the current pixel, step 328 writes the calculated value to the pending pixel.

Once step 328 has been performed, step 330 sets CY to zero in preparation for future calculation. Then Step 332 test to see if the fillStart and fillEnd intersections are in the same pixel. If so, steps 333 and 336 are performed. Step 334 sets CY equal to the previous value of CY plus the distance between fillstart and fillEnd's intersections. Then step 336 sets the pendingpixel# to the pixel number of fillEnd's pixel.

If the condition in step 332 are not met, the else statement 338 causes steps 340 through 352 to be performed. Step 340 sets the variable CY equal to the former value of CY plus the distance between fillStart's intersection and where the y line reaches the end of the pixel in which that intersection occurs.

Step 342 sets the pendingpixel# equal to number of the pixel in which fillstart is located. Then step 344 through 348 are performed, which are identical to steps 324 through 328 discussed above. Step 342 sets CX equal to the prior pixel coverage value of the pending pixel which was set in the x pass of the system's two-pass process. Then step 346 calculates a coverage value for the pending pixel as a function of CY and CX, and step 348 writes the calculated coverage value to the pending pixel.

Once steps 344 through 348 are complete, step 350 sets CY equal to the distance between where the current y line meets the start of fillEnd's pixel and the position of fillEnd's intersections. Finally step 352 sets the pendingpixel# to the number of fillEnd's pixel.

By studying the YLineLoop of FIG. 36, it can be seen that the condition of step 332 of FIG. 36 will be met where the intersections which both start and end a separate continuously covered portion of a y line occur in the same pixel. Such a case is illustrated by intersections 243C and 243D shown in FIG. 43. In the pixel in which these two y intersections occur CY equals the distance 380 shown in FIG. 43. Since there are no other covered y line segments in that pixel, this value of CY will be used by step 322 through 330 in a subsequent iteration of the YLineLoop 312 to calculate the pixel's coverage value in conjunction with a value CX corresponding to the prior coverage value calculated for the pixel in the x pass of the two-pass process.

Figure 43:
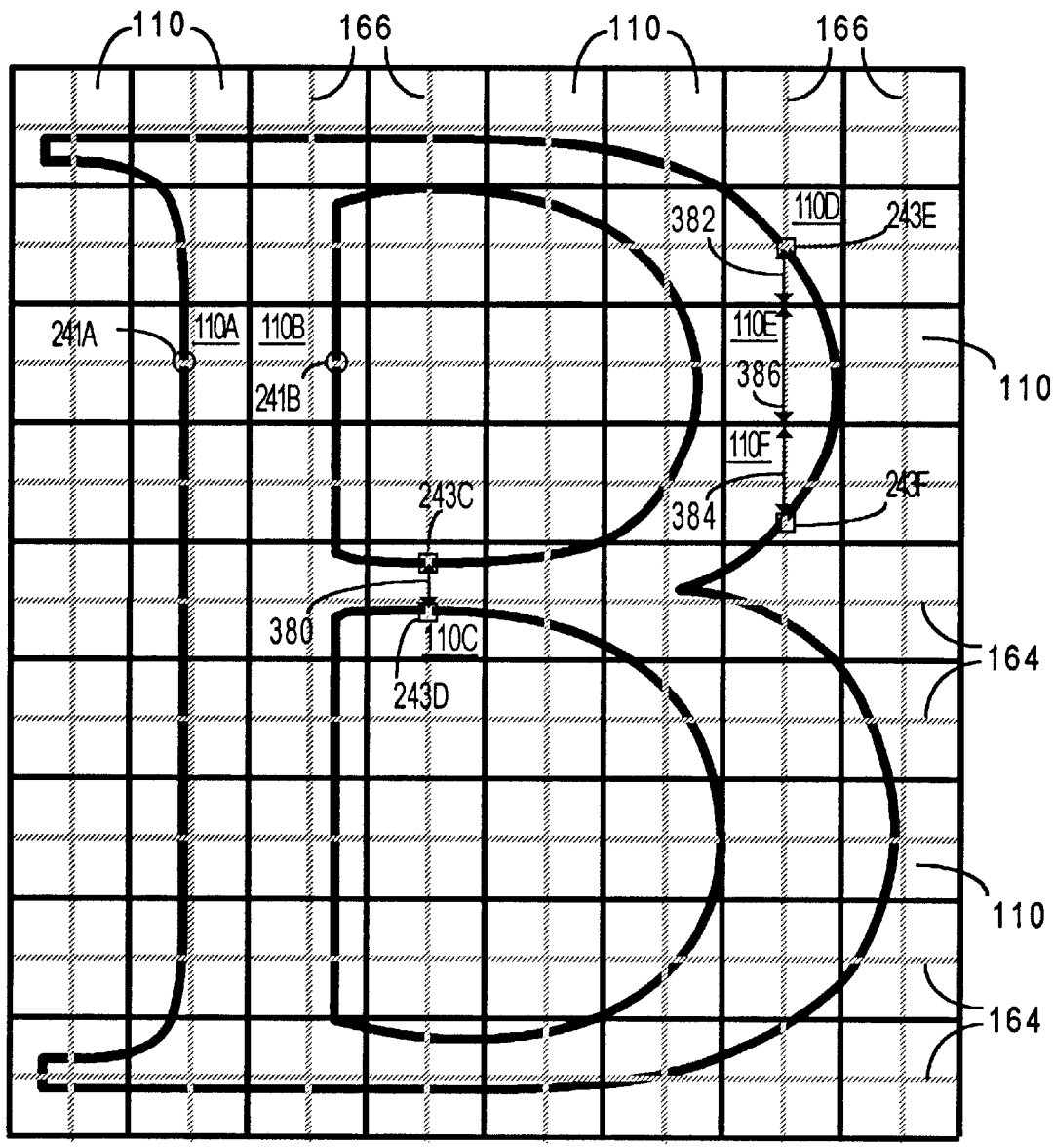
FIG. 43 helps illustrate how y line coverage values are calculated for pixels according to the algorithm of FIG. 36.

The two y line intersections 243E and 243F shown in FIG. 43 illustrate a case in which the else step 338 of FIG. 36 will cause steps 340 through 352 to be performed. In this case step, 340 will cause the distance 382 between the position of the fillStart intersection 243E and the end of that intersection's pixel 110D to be used as CY for purposes of calculating the coverage value for that pixel.

Step 350 will cause the CY used to calculate the coverage value of the pixel 110F in which fillEnd's intersection 243F occurs to equal the distance 384 shown in FIG. 43 which extends between fillEnd's intersection and the start of the pixel 110F.

After steps 322 through 352 have been completed for a given pair of fillStart and fillEnd intersections, step 354 tests to see if there are any more intersection in the current y line's linked list after that currently pointed to by fillEnd. If so, it causes steps 356 and 358 to be performed.

Step 356 points fillStart to that next intersection in the current y line's linked list and step 358 points fillEnd to the following intersection in that list. If the test in step 354 finds there are no subsequent intersections in the current y line's linked list, the else statement 360 causes step 362 to breaks from the YLineLoop 312.

When step 360 does break from the YLineLoop, step 364 tests to see if pendingPixel# is currently non-NULL, that is, has a number associated with a pixel in the bitmap of the character being rendered. If pendingpixel# is associated with such a pixel, step 364 causes steps 366 through 370 to be performed.

Step 366 sets the variable CX to the prior coverage, or grayscale, value of the pending pixel. Then step 368 calculates a new coverage value for the pending pixel as a function of both CY he and CX, using non-linear functions such as those shown in FIGS. 37 through 40. Next step 370 writes the calculated pixel coverage value to the pending pixel.

FIGS. 44 through 51 help illustrate the operation of the two-pass procedure described above with regard to FIGS. 33 through 36 when the binary algorithm of FIG. 39 is used for calculating pixel coverage values of the capital "B" shown in FIGS. 41 and 43.

In the embodiment of the invention being described, the pixel and line coverage values all range between zero and one-twenty-six. Thus, in FIGS. 44, 46, 48 and 50 a value of one-twenty-six represents total coverage and a value of zero represents no coverage. In this embodiment any value less than one-twenty-six represent partial transparency, with zero representing total transparency. This allows the edges of bitmap's calculated for adjacent characters to be superimposed upon one another so their coverage values can be combined if the characters are closely spaced. It also allows the character's image to be rendered on top of a background color or image.

FIG. 44 shows the pixel coverage values which would be calculated for the capital "B" by the first, or x, pass of the loop 202 shown in FIG. 33. These pixel coverage values would be equal to the x line coverage values with each pixel.

FIG. 45 uses varios grayscale shadings to approximate the numerical bitmap values shown in FIG. 44. This has been done to provide a more visually comprehensible representation of the information contained in the bitmap after the x-pass.

FIG. 46 represents the y line coverage value associated with each pixel shown in FIG. 43 which has a y line intersection in it. In the second, or y, pass of the two-pass procedure, y line coverage values are only calculated for pixels in which there are such y intersections. This is done to reduce computation and speed the rendering process. In the current embodiment the data shown in each pixel is store only during the processing of that pixel so as to reduce storage requirements. Thus the data shown in this figure does not exist at any one time in any data structure.

FIG. 47 provides a graphic illustration of the numerical data shown in FIG. 46 using grayscale shading.

FIG. 48 illustrates those of the y line coverage value shown in FIG. 46 which have a value which is more intermediate, that is closer to 63 than the x line coverage values for the same pixel's shown above in FIG. 44. According to the Formula shown in FIG. 39, only these more intermediate y line coverage values will be written to bitmap as pixel coverage values for the character being rendered.

FIG. 49 is a graphic illustration of this numerical data.

FIG. 50 illustrates the bitmap of FIG. 44 at the completion of the two-pass process once it is had the more intermediate y line coverage values shown in FIG. 48 written into it.

The FIG. 51 is a graphic illustration of the numerical data shown in FIG. 50 and it shows the anti-aliased bitmap of the capital "B" at the completion of the two-pass process.

FIG. 52 is a table representing the pixel coverage value that will be calculated according to the binary formula shown in FIG. 39 for a given pixel given a range of possible x and y coverage values CX and CY.

In this table x line coverage values, CX, are listed across the top of the table and y line coverage values, CY, are listed in the column extending down the left-side of the table. In this table only a subset of coverage values are used. In the current embodiment of the invention, the x line, y line, and pixel coverage values are limited to even number between 0 and 126, but for purposes of displaying an intermediate coverage value a coverage value of 63 is shown in this table. Of course in other embodiment other numbering schemes could be used.

Figure 53:
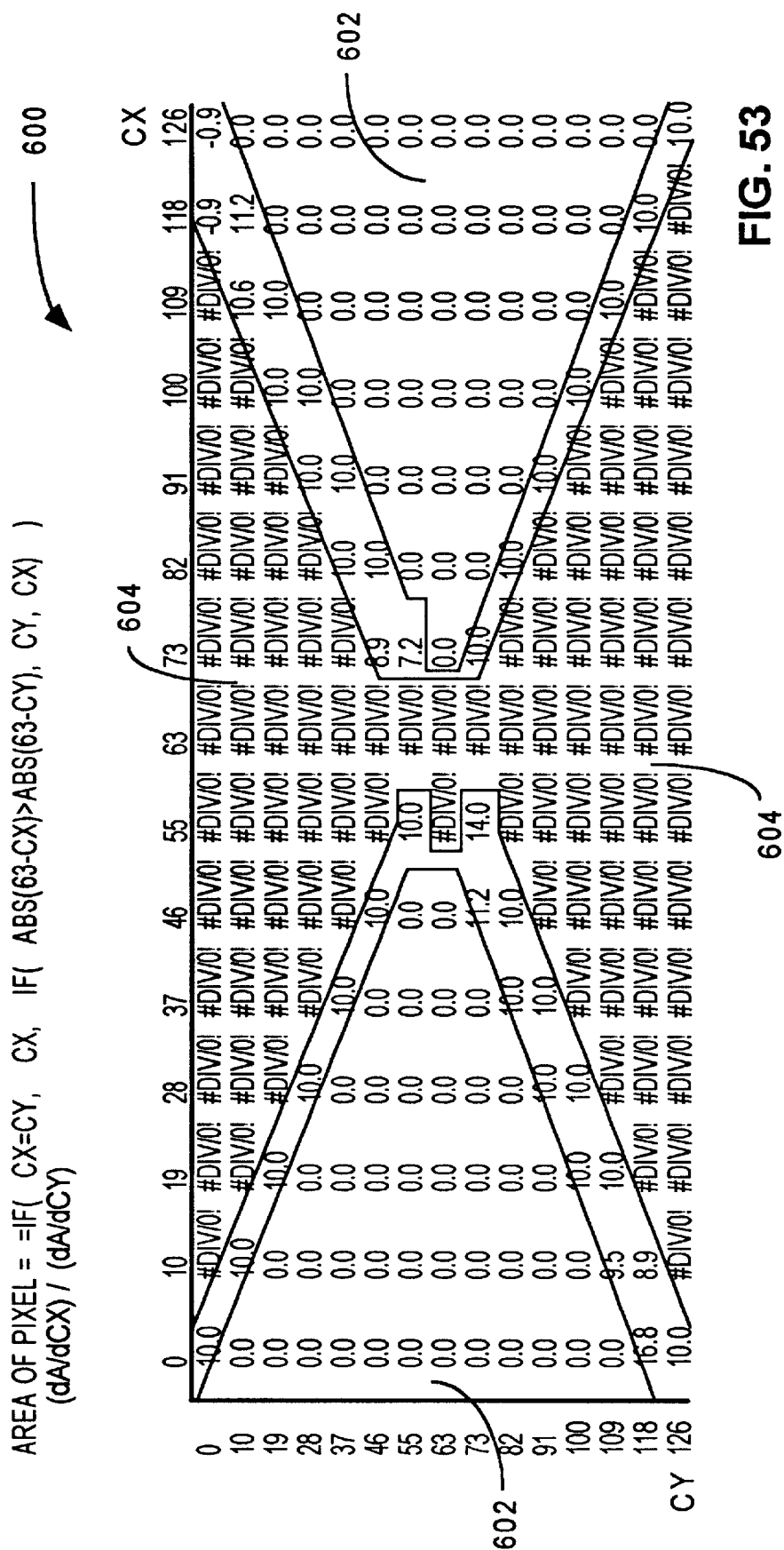
FIG. 53 is a table used to illustrate that over most of the domain of the formula used in FIG. 39 the pixel coverage value varies more rapidly with the value of that one of its two sampling lines, x or y, which has the most intermediate sampling value.

FIG. 53 is a table whose entry values are derived from the table of FIG. 52 by use of a spread sheet. The table of FIG.

53 has the same row and column definitions as the table FIG. 52, but the entries of the table in FIG. 53 represent an overall ratio between two sub-ratios. The first of the two sub-ratios, that which is the numerator in the overall ratio, is the rate of change of the pixel's coverage value, delta A (where "A" stands for covered area), divided by delta CX, the rate of change in x line coverage value. The second sub-ratio, that which is the denominator in the overall ration, is the rate of change of the pixel's coverage value, delta A, divided by delta CY, the rate of change of the y line coverage value.

As can be seen from this table over most are of its domain the coverage value of the pixel varies more rapidly with changes in that one of the sampling line coverage values, either the x or y line's coverage value, which has the most intermediate value, i.e., that which is closest to the entry in the table having a both a CX and CY value of 63. In the portions of the table marked 602 the y line value CY has a more intermediate value than the x line values CX. In this area of the table the overall ratio is 0 since, according to the binary formula of FIG. 39, the coverage value A does not vary at all with changes in CX, which is more extreme than CY in this area. Thus, the numerator in the overall ration is zero.

Similarly in the region 604 shown in FIG. 53 the overall ratio has an infinite value, indicated by the "#DIV0!" error message produced by the spread sheet used to calculate the table. This is because in this area 604 the denominator of the overall ratio is zero, since in this area the pixel coverage value A does not change at all with the value of CY, since in this area CX is more intermediate than CY.

If table similar to FIG. 53 were formed for the formulas shown in FIGS. 37 and 38 they would also have areas covering the majority of the domain of their associated tables with shapes generally similar to the areas 602 and 604 in which the pixel coverage values would be changing more rapidly in association with the line coverage value, either CX or CY, with the more intermediate value. The same would be generally true for a similar table calculated for the rate of change of pixel coverage values determined by look-up tables used by the method of FIG. 40.

FIGS. 54 through 58 illustrates some of the many other arrangement of sampling lines which can be used with the present invention.

In FIG. 54, a pixel has associated with it two horizontal x-sampling lines x1 and x2, and two vertical y sampling lines y1 and y2. In this arrangement the sampling lines occur at the boundaries of each pixel.

In FIG. 55, a pixel have two horizontal x sampling lines, x1 and x2, and two vertical y sampling lines y1 and y2. But in this case, the sampling lines occur at approximately ¼ and ¾ of the way across the pixel in the horizontal and vertical direction, respectively.

In FIG. 56, there are only two sampling lines per pixel, similar to the x and y sampling lines discussed with regard to FIGS. 13 through 32, but in FIG. 56 the sampling lines are each rotated 45 degrees relative to the boundaries of the pixel. As a result, one sampling line, labeled +45 has a slope of positive one, and one sampling line, labeled −45, has a slope of minus one.

In FIG. 57 a pixel has four sampling lines, two of which, labeled +45A and +45B have a slope of plus one, and two of which, labeled −45A and −45B, have a slope of minus one.

Finally FIG. 58 shows an embodiment of the invention where each pixel has four sampling lines. A horizontal medial x line, labeled x, a vertical medial y line labeled y, and two medial line, one labeled +45 having a slope of plus one, and one, labeled −45, having a slope of minus one. This combination of four medial would provide more accurate pixel coverage information than the use of just one medial x and y line as shown in FIGS. 13 through 32, but the inventor has found that the use of just one horizontal and one vertical medial line, as in FIGS. 13 through 32, normally provides sufficiently good results, and such a use of only two lines significantly reduces computation.

FIG. 59 shows a formula which is similar to formula 38 which can be used with all of the sampling line arrangements shown in FIGS. 54 through 58. In this formula each of the two or four sampling lines is given a number L1 through L4 in the formula. The coverage value calculated for each such line is labeled CL1 through CL4, respectively. Where there are only two sampling lines the terms relating to L3 and L4 are removed. In the case of the pixel shown in FIG. 13 through 32, once the terms relating to L3 and L4 are removed the formula of FIG. 59 corresponds to the formula of FIG. 38.

Those skilled in the art will appreciate that other formulas for calculating pixel coverage values as a non-linear function of a pixel's different sampling line coverage values, such as the formulas shown in FIGS. 37, could also be adapted to handle pixel's with sampling lines of the type shown in FIGS. 54 through 58.

FIG. 40 describes a procedure 650 for determining a pixel's coverage values from a look-up table. The procedure includes a step 652 which forms a look-up address from a combination CX and CY. Then step 654 uses that look-up address to read a corresponding pixel coverage value from a look-up table.

To reduce the memory required to store such a table, the range of all possible values of CX and CY, values of 0 to 126, could be mapped into eight substantially equally spaced regions, each of which would be represented by a three bit binary number ranging from 0 to 7. The address of each entry in the table would be represented as a concatenation of two such three bit numbers, one for the value of CX and one for the value of CY.

In other embodiments, other sized look-up tables and other types of addressing schemes could be used. For example, where each pixel has four sampling lines, as in FIGS. 54, 55, 57, and 58, the address used to represent a given pixel coverage value could be concatenated from four such three bit numbers, each representing the coverage value of a separate one of the pixel's four sampling lines.

FIG. 60 shows a method 700 for training such a lookup table.

The method 700 includes performing a loop 702 for the pixel rendering, or scan conversion, of each of multiple different characters used to train up the look-up table. In this loop 702, for each character to be scan converted into a pixel image, step 704 performs a loop for each pixel row in the current character's bitmap. The loop 704 includes an inner loop 706 which is performed for each pixel in the current pixel row of loop 704.

Figure 7:
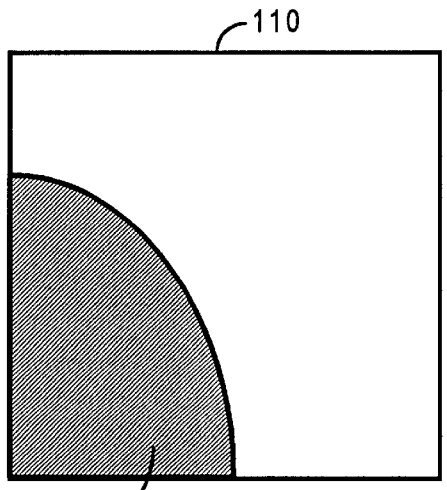
FIG. 7 shows an individual pixel of a bitmap which is partially covered by a high resolution shape.
Figure 8:
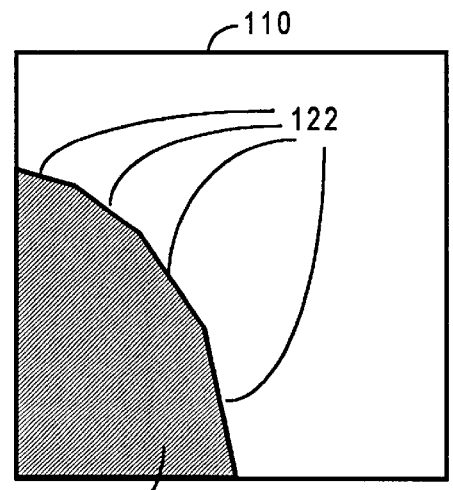
FIGS. 8 through 10 are used to help explain approximation methods which have been used in the prior art to speed the calculation of the percentage of a pixel such as the pixel in FIG. 7, which is covered by one or more shapes to be rendered.
Figure 9:
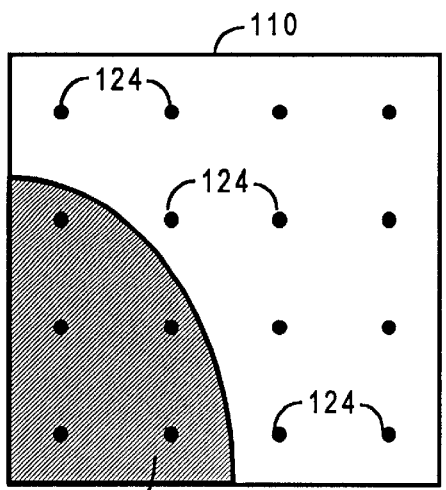

The inner loop 706 performs steps 708 through 716. Step 708 makes an relatively accurate calculation of the current pixel's coverage value, such as by using a method described above with regard to FIGS. 7 or 8. Then step 710 tests to see if the pixel is a boundary pixel, one with a coverage value other than one representing total coverage or zero coverage.

If the current pixel is a boundary pixel, steps 712 through 716 are performed. Step 712 calculates the sampling line coverage values CX and CY for the current pixel. Then step 714 adds the accurate pixel coverage value calculated in step 708 to the element in the training lookup table at an address formed by a concatenation of numbers representing those values of CX and CY. Finally step 716 increments a sampleCount variable to keep track of the number of training instances which have been performed.

Once the loop of step 702 has been performed for the scan conversion of all the characters for which training is to be done, step 718 divides each element in the training table by the sampleCount to normalize the pixel coverage values stored in the table. Once this has been done the look-up table is ready for use by the formula in FIG. 40.

FIG. 61 illustrates how to train a look-up tables for use in a scan conversion scheme having more than two sampling lines per pixel, such those described above with regard to FIGS. 54, 55, 57, and 58. In particular FIG. 59 illustrates a method 700A for training up a lookup table for use with star-shaped arrangement of four sampling lines shown in FIG. 58.

The method 700A of FIG. 61 is identical to the method 700 of FIG. 60, except that it uses steps 712A and 714A instead of the steps 712 and 714 of FIG. 60. Step 712A calculates pixel coverage values not only for the x and y sampling lines, as is done in step 712 of FIG. 60, but also for the +45 and −45 degree lines shown in FIG. 58. Step 714A differs from step 714 of FIG. 60, in that it addresses the training table by a concatenation of not only numbers representing CX and CY, but also of numbers representing coverage values for the +45 and −45 lines.

Those skilled in the art will understand that such a training table can easily be created for virtually any type of sampling line schemes.

FIGS. 62 and 63 relate to an alternate method of using look-up tables to find pixel coverage values in which separate look-up tables are used for different sets of fonts.

FIG. 63 shows a training method 700B which is similar to the training method 700 of FIG. 60. The only differences are the addition of new steps 720 and 722, and the modifications shown in steps 714B, 716B, and 718B. All of these differences are designed to support the training of different look-up tables for different sets of fonts.

The new step 720 is performed at the start of the method 700B. It defines the different sets of font for which different look-up tables are to be created. Often this step would be performed by using human selection. In different embodiments of the method, the font sets could be defined differently. In some embodiments, the different font sets would represent different font sizes. In other, the different font sets would represent different font styles, or a combination of different fonts styles and sizes.

Once the different font sets have been defined the method 700B progresses in a manner similar to the operation of method 700 until steps 714B, 716B, 722, and 718B are performed.

Step 714B is similar to step 714 of FIG. 60, except that it adds the accurately calculated pixel coverage value for the current pixel to the corresponding element of that particular training table which is being trained for the font set in which the font of the current character belongs.

Step 716B is similar to step 716 of FIG. 60, except that it increments a separate sampleCount variable associated with the current character's font set.

Once all of the training loops of step 702 have been performed by the method 700B, step 722 performs a loop for each font set. Each such iteration a step 718B is performed for the separate training table created for that loop's corresponding font set. Step 718B is similar to the step 718 of FIG. 60, except that it performs its function of dividing all the element of a training table by the sampleCount for the training table and with the sampleCount which are associated with the current font set.

FIG. 63 describes a procedure 650B which is similar to the procedure 650 of FIG. 40 except that it uses a group of separate look-up table created for different font sets to determine pixel coverage values. Its step 652B forms a current look-up address from numbers representing the current pixel's sampling line coverage values. Then step 654B obtains the pixel coverage value stored at that loop-up address in the look-up table associated with the font set of the current character being rendered.

It should be understood that the foregoing description and drawings of the invention are given merely to explain and illustrate it and that the invention is not limited thereto except insofar as the interpretation of the appended claims are so limited. Those skilled in the art who have the disclosure before them will be able to make modifications and variations therein without departing from the scope of the claims.

In particular, it should be noted that this application explains the present invention in more detail than is common in many patent applications, and the inventor trusts he will not be improperly punished for providing a more detailed teaching of his invention to the public by having the scope of his claims limited to that more detailed teaching. Considerable thought has gone into the wording of the following claims so that they will provide an accurate description of what the inventor considers to be his invention, and it is hoped that such wording will be viewed as the most accurate description of exactly which details are considered to be part of an invention recited by a particular claim and those which are not.

As those skilled in the computer arts will understand, many of the functions described above as being performed in software could be performed in hardware. For example, special propose hardware could be placed in an intergrated circuit, such as an ASIC, or even a microprocessor, to perform many, if not all of the scan conversion functions described above or claimed below.

Similarly those skilled in the computer arts will understand that software is an incredibly flexible art form in which most function can be performed in a virtually infinite number of ways. Thus, the inventor does not intend that the claims to be limited to the particular organization, sequencing, and structure of the software described above, since those skilled in the art could easily practice the teaching of the claims using programming with markedly different organization, sequencing, and structure. Similarly, as is indicated above, many types of sampling line arrangements and many types of pixel coverage calculations other than those described above could be used with many aspects of the present invention.

It should be understood that although much of the above discussion focused on the rendering of pixel images in which the PIXELS are aligned in orthogonal rows and columns, the present invention could be used with non-orthogonal rows and columns, such as are sometimes used in the rendering of printed images.

It should also be understood that the arrangement of sampling lines shown in FIGS. 13, and 54–58, only represent a few of many possible arrangement of possible sampling lines which could be used with the invention. As just one example such other possibilities, although would normally reduce the accuracy of anti-aliasing, it would be possible for one to have an arrangement of sampling lines similar that shown in FIG. 54 in which the two horizontal and two vertical sampling lines were slightly outside of the actual area represented by the pixel whose coverage value they are used to help calculate. In such a case, such sampling lines would be considered within the "sampling area" of the pixel for purposes of the claims.

It should also be understood that in other embodiments of the invention it is possible to calculate pixel coverage value as a function of information other than just the coverage values of a pixel's sampling lines. For example, as discussed above with regard to FIGS. 62 and 63, the font of the character, including its size, could be used as additional information upon which the determination of a pixel's coverage value might depend. In other embodiments many other types of information could be used, including the coverage value of adjacent pixels and/or the location within a pixel at which sampling line's are covered.

It should further be understood that the non-linear function used to determine pixel values as a function of line coverage values of lines running in different directions within a pixel could be other types of non-linear functions, including sigmoidal functions and functions trained by neural network, or other automatic learning, techniques.

It should further be understood that the claims of the present invention are not limited to the rendering of two dimensional shapes. Those skilled in the art will appreciate that the specific methods describe above could be extended to cover the rendition of high resolution shapes which are described in three or more dimensions.

It should also be understood that the invention can be used in scan conversion schemes which use techniques other than a winding count to keep track of whether a given portion of a line or an area is inside or outside of a shape being rendered. Similarly, other programming structures besides linked lists could be used to store a representation of the intersections associated with a given sampling line.

The invention can be practiced on many different types of computer than that shown in FIG. 11. To list just a few, it could be used on computers with multiple CPU's, on computers with separate graphic, video, or DSP processors which could be used to help perform the calculations of the scan conversion process. It could be used in computers not having hard disks, such as so-called network or set-top computers. It can be used on any type of computer which is used to render pixel images of higher resolutions shapes, including without limitation electronic books, palm computers, wearable computers, and electronic billboards.

What I claim is:

1. A computerized method for setting pixel coverage values in a 2-diminsional pixel image for use in human-readable displays in which the pixel image represents a higher-resolution 2-dimensional representation of one or more shapes defined at a finer resolution than the resolution of the pixel image and in which the pixel image is formed of a plurality of pixels, each representing a corresponding sampling area of the higher-resolution representation and each having a pixel coverage value indicating the extent to which the corresponding sampling area is covered by one of said shapes, said method comprising the following for each of a plurality of said pixels:

determining a line coverage value for each of at least two sampling lines running in different non-parallel directions within the pixel's corresponding sampling area as a function of the degree to which the sampling line is covered by any of said shapes within the sampling area; and determining the pixel coverage value for the pixel as a non-linear function of the line coverage values determined for the two sampling lines.

2. A computerized method as in claim 1 wherein, over a majority of possible different combinations of line coverage values for the two sampling lines produced by the method, the rate of change of the pixel coverage value varies more rapidly with variations in the line coverage value of that one of the two sampling lines whose line coverage value is nearest a value associated with one half of the sampling line being covered by said shapes.

3. A computerized method as in claim 2 wherein, over a majority of possible different combinations of line coverage values for the two sampling lines produced by the method, the rate of change of the pixel coverage value varies only in response to the line coverage value of that one of the two sampling lines whose line coverage value is nearest a value associated with one half of the sampling line being covered by said shapes.

4. A computerized method as in claim 2 wherein, over a majority of possible different combinations of line coverage values for the two sampling lines produced by the method, the rate of change of the pixel coverage value varies in response to variations in the line coverage values of both of said two sampling lines.

5. A computerized method as in claim 1 wherein the non-linear function determines the pixel coverage value by looking up a value at a location in a look-up table which is addressed as a function of the line coverage values of at least the two sampling lines.

6. A computerized method as in claim 5 wherein the value at a location in the look-up table addressed by a given combination of line coverage values of the two sampling lines is derived from a plurality of pixel coverage value calculated made by a more computational intensive method in prior situations in which a pixel had a corresponding combination of line coverage values.

7. A computerized method as in claim 5 wherein said shapes are the shapes of characters in one or more sets of fonts, and where the method includes using different look-up tables to determine the pixel coverage value when rendering characters from different sets of fonts.

8. A computerized method as in claim 1 wherein the non-linear function determines the pixel coverage value as a function of the line coverage values of at the two sampling lines which involves a weighted sum of the two line coverage values in which the contribution of each of the two line coverage values is a function of how close each such line coverage value is to an intermediate line coverage value.

9. A computerized method as in claim 1 wherein said two sampling lines are at right angles relative to each other.

10. A computerized method as in claim 9 wherein:

said pixel image is comprised of pixels arranged in rows and columns; and said coverage values are determined for only two sampling lines in each pixel, one sampling line extending in substantially in the middle of each pixel row and one sampling line extending substantailly in the middle of each pixel column.

11. A computerized method as in claim 1 wherein:

said shapes are described by outlines which define said shapes at a higher resolution than the pixel resolution of said pixel image; and said determining of line coverage values determines such line coverage as a function of the distance between intersections between the outlines of said shapes and the sampling lines.

12. A computerized method for creating a 2-diminsional pixel image for use in human-readable displays in which the pixel image represents a higher-resolution 2-dimensional representation of one or more shapes defined at a finer resolution than the resolution of the pixel image and in which the pixel image is formed of a plurality of pixels, each representing a corresponding sampling area of the higher-resolution representation and each having a pixel coverage value indicating the extent to which the corresponding sampling area is covered by one of said shapes, said method comprising:

calculating the intersections between said shapes and a first set of parallel sampling line running in a first direction in said higher-resolution representation;

calculating the intersections between said shapes and a second set of parallel sampling line running in a second direction, different than, and non-parallel to, said first direction, in said higher-resolution representation;

performing a first pixel setting pass including calculating a pixel coverage value for each pixel by:
determining the line coverage values of the one or more sampling lines of the first set in said pixel's sampling area as a function of the degree to which such sampling lines are covered by any of said shapes within the sampling area; and
then determining the pixel coverage value for the pixel as a function of such line coverage values; and after performing the first pass, performing a second pixel setting pass which only changes pixel coverage values set in the first pass for pixels presenting a sampling area in which one or more of said intersections between said shapes and the second set of sampling lines have been calculated, said second pass changing the pixel coverage value of a pixel in which such an intersection has been calculated by:
determining the line coverage values of the one or more sampling lines of the second set in said pixel's sampling area as a function of the degree to which such sampling lines are covered by any of said shapes within the sampling area; and
then determining the pixel coverage value for the pixel as a function of the line coverage values calculated for the pixel in the first pass and the line coverage values calculated for the pixel in the second pass.

13. A computerized method as in claim 12 wherein:
the pixel image is comprised of a series of pixel rows stored in a memory at sequential addresses, and each pixel row includes a series of said pixel coverage values stored in the memory at more closely spaced sequential addresses; and
the first pass is performed for sampling lines which extend in the direction of such pixel rows.

14. A computerized method as in claim 12 wherein said pixel image is comprised of a two dimensional array of pixels, and said first and second directions correspond to the two dimensions of said array.

15. A computerized method as in claim 12 wherein said second pass causes the pixel coverage value for a pixel to be determined as a non-linear function of the line coverage values of sampling lines running in said first and second directions, in which the rate at which the pixel coverage value changes as a function of the rate of change in a given line coverage value varies as a function of the line coverage value itself.

16. A computerized method for creating a 2-diminsional pixel image for use in human-readable displays in which the pixel image represents a higher-resolution 2-dimensional representation of a character-font shape defined by outlines at a finer resolution than the resolution of the pixel image and in which the pixel image is formed of a plurality of pixels arranged in rows and columns, each pixel representing a corresponding sampling area of the higher-resolution representation and each having a pixel coverage value indicating the extent to which the corresponding sampling area is covered by one of said shapes, said method comprising:

calculating the intersections in said higher-resolution 2-dimensional representation between said shape outlines and a set of parallel row sampling lines which run along said pixel rows and between said shape outlines and a set of parallel column sampling line which run along said pixel columns, said calculation including:
advancing around each outline of the character-font shape, finding each such intersection which occurs during such advance; and
placing each such intersection with a given sampling line in an ordered intersection list associated with the sampling line, in an ordered position indicating its distance, relative to any other such intersections which occur with the sampling line, to a start end of the sampling line;

performing a first pixel setting pass including:
for each pixel row:
for each pixel in the row starting with the pixel nearest the start end of its corresponding row sampling line:
if there is no intersection in row sampling line's associated intersection list which occurs in the pixel's sampling area, set the pixel to a pixel coverage value corresponding to the sampling line's current line coverage state;
else:
change the sampling line's current line coverage state to reflect each successive intersection in the intersection list in the pixel's sampling area;
calculate a row line coverage value as a function of the portion of the row sampling line within the pixel's sampling area which is covered by the character-font shape; and
set the pixel to a pixel coverage value determined as a function of the row line coverage value calculated for the pixel; and performing a second pixel setting pass after performing the first pass, said second pass including;
for each pixel column with any intersections in its associated intersection list:
for each pixel in the column starting with the pixel nearest the start end of its corresponding column sampling line, for which there is an intersection in corresponding intersection list in the pixel's sampling area:
change the column sampling line's current line coverage state to reflect each successive intersection in the intersection list in the pixel's sampling area;
calculate a column line coverage value as a function of the portion of the column sampling line within the pixel's sampling area which is covered by the character-font shape; and
set the pixel's pixel coverage value as a function of row line coverage value calculated for the pixel in the first pass and the column line coverage value calculated for the pixel in the second pass.

17. A computerized method as in claim 16 wherein the function used to set pixel coverage values in the second pass as a function of a pixel's row and column line coverage values, is a non-linear function in which, over a majority of possible different combinations of row and column line coverage values, the rate of change of the pixel coverage value varies more rapidly with variations in the line coverage value of that one of the pixel's row or column sampling line whose line coverage value is nearest a value associated with one half of the sampling line within the pixel being covered said shapes.

18. A computer readable memory including computer programming for setting pixel coverage values in a 2-diminsional pixel image for use in human-readable displays in which the pixel image represents a higher-resolution 2-dimensional representation of one or more shapes defined at a finer resolution than the resolution of the pixel image and in which the pixel image is formed of a plurality of pixels, each representing a corresponding sampling area of the higher-resolution representation and each having a pixel coverage value indicating the extent to which the corresponding sampling area is covered by one of said shapes, said programming including instructions for:

determining a line coverage value for each of at least two sampling lines running in different non-parallel directions within the pixel's corresponding sampling area as a function of the degree to which the sampling line is covered by any of said shapes within the sampling area; and determining the pixel coverage value for the pixel as a non-linear function of the line coverage values determined for the two sampling lines.

19. A computer readable memory as in claim 18 wherein, over a majority of possible different combinations of line coverage values for the two sampling lines produced by the method, the rate of change of the pixel coverage value varies more rapidly with variations in the line coverage value of that one of the two sampling lines whose line coverage value is nearest a value associated with one half of the sampling line being covered by said shapes.

20. A computer system for setting pixel coverage values in a 2-diminsional pixel image for use in human-readable displays in which the pixel image represents a higher-resolution 2-dimensional representation of one or more shapes defined at a finer resolution than the resolution of the pixel image and in which the pixel image is formed of a plurality of pixels, each representing a corresponding sampling area of the higher-resolution representation and each having a pixel coverage value indicating the extent to which the corresponding sampling area is covered by one of said shapes, said programming including instructions for:

computational logic for determining a line coverage value for each of at least two sampling lines running in different non-parallel directions within the pixel's corresponding sampling area as a function of the degree to which the sampling line is covered by any of said shapes within the sampling area; and computational logic for determining the pixel coverage value for the pixel as a non-linear function of the line coverage values determined for the two sampling lines.

21. A computer system as in claim 20 wherein, over a majority of possible different combinations of line coverage values for the two sampling lines produced by the method, the rate of change of the pixel coverage value varies more rapidly with variations in the line coverage value of that one of the two sampling lines whose line coverage value is nearest a value associated with one half of the sampling line being covered by said shapes.

* * * * *